United States Patent [19]
Dutta et al.

[11] Patent Number: 5,277,245
[45] Date of Patent: Jan. 11, 1994

[54] HEAT TRANSFER IN FLUIDIZED BED OF COHESIVE POWDER

[75] Inventors: Arunava Dutta, Chestnut Hill; Leonard V. Dullea, Peabody, both of Mass.

[73] Assignee: GTE Products Corp., Stamford, Conn.

[21] Appl. No.: 968,543

[22] Filed: Oct. 29, 1992

[51] Int. Cl.[5] ............................................. F28C 3/16
[52] U.S. Cl. .............................. 165/104.16; 165/104.13; 34/57 A
[58] Field of Search .................. 165/104.16, 104.13; 122/4 D; 34/57 A

[56] References Cited

U.S. PATENT DOCUMENTS 4,747,447 5/1988 Scanlan et al. ................. 165/104.34

*Primary Examiner*—Albert W. Davis, Jr.
*Attorney, Agent, or Firm*—Robert E. Walter

[57] ABSTRACT

In method for enhancing heat transfer in a bed of powder comprising cohesive Geldart type C particles confined by a wall of a vertically oriented container and being fluidized by the upward flow of fluidizing gas through the bed of powder, heat is transferred between the bed of powder and the wall of the container, and, prior to fluidizing the particles, the fluidizing gas is selected so as to comprise a sufficient amount of helium, hydrogen, or mixtures thereof for obtaining a thermal conductivity of the fluidizing gas of at least four times that of nitrogen for enhancing heat transfer between the wall and the bed.

20 Claims, 22 Drawing Sheets

FLUID BED APPARATUS

1 - GAS HEATER
2 - PLENUM T/C TYPE J
3 - PRESSURE TRANSDUCER
4 - SS PLATE
5 - SS PLATE
6 - 5um POROUS PLATE
7 - SS PLENUM
8 - SS COLUMN
9 - THERMOCOUPLE TYPE J
10 - HEATING TAPE
11 - BLANKET INSULATION
12 - POWDER

FLUID BED APPARATUS

1 - GAS HEATER
2 - PLENUM T/C TYPE J
3 - PRESSURE TRANSDUCER
4 - SS PLATE
5 - SS PLATE
6 - 5um POROUS PLATE
7 - SS PLENUM
8 - SS COLUMN
9 - THERMOCOUPLE TYPE J
10 - HEATING TAPE
11 - BLANKET INSULATION
12 - POWDER

HEAT TRANSFER IN FLUIDIZED BED OF COHESIVE POWDER

FIELD OF INVENTION

The present invention relates to fluidized beds where particles in a container are fluidized by an upwardly flowing gas which is distributed through a porous bottom portion of the container so as to fluidize the particles.

BACKGROUND OF THE INVENTION

As set forth by D. Geldart, *Types of Gas Fluidization, Power Technology*, 7(1973) 285-292, the behavior of fluidized beds falls into easily recognizable groups depending on the density difference between the gas and the solids and mean particle size. Group A powders exhibit dense phase expansion after minimum fluidization and prior to the commencement of bubbling. Group B bubble at the minimum fluidization velocity. Group C are difficult to fluidize at all and those in group D can form stable spouted beds. In another publication, Geldart and Wong, *Fluidization of Powders Showing Degrees of Cohesiveness—I. Bed Expansion, Chemical Engineering Science*, Vol. 39, No. 10, pp. 1481-1488 (1984), describes the Hausner ratio, which is the ratio of the tapped bulk density to loosely packed bulk density, as giving a good indication of the cohesiveness of the powder.

The present invention is concerned with heat transfer in fluidized beds of Geldart group C powders which are cohesive and difficult to fluidize. In general, the rate at which heat is transferred between the wall of a fluidized bed and the fluidized powder or particles is given by the equation:

$$Q = hA(\Delta T)$$

where

Q is the rate of heat transfer, W h is the wall to bed heat transfer coefficient, $W/m^2 \cdot K$ A is the area of the bed in contact with the heated wall, $m^2$ $\Delta T$ is the temperature difference between the wall and the bed, K.

Heat often needs to be transferred from the wall to the particles in a fluid bed reactor to maintain the bed temperature at the optimum level for thin film deposition on cohesive powders like phosphors. For example, U.S. Pat. No. 4,825,124 to Sigai, in column 7, lines 32 to 37, describes the use of a resistance heated zone furnace for heating a fluidized bed of cohesive particles, and, in column 3, lines 53 to 55, describes nitrogen, argon, helium, neon or mixtures thereof as examples of inert gases "suitable for use". There is no discussion, however, of the heat transfer characteristics of the bed. As opposed to bubbling fluidized beds which are noted for high values of h, fluid cohesive powders are handicapped by low values of h since they do not have bubbles to induce large scale particle motion. This results in a problem: a large wall area A is required to transfer the needed Q into the bed for a practical value of $\Delta T$. A large wall area may be realized by increasing the diameter and/or the height of the column, both of which pose difficulties in the case of cohesive powder fluidization. In particular, a larger bed diameter makes heat transfer to volume elements near the center of the column more of a problem. In addition, a longer bed height increases the length of the channels of gas and makes it more challenging to break up these channels. Any improvement in cohesive fluid bed operation wherein the value of h can be increased is, therefore, a major advancement in the fluid bed CVD of thin films on cohesive powders.

While the above situation is described in conjunction with the heating of fluidized beds, there are instances where heat may have to be extracted from the cohesive powder fluidized bed. For example, the region of a bed close to the porous gas distributor may have to be cooled to prevent decomposition of a reactant and plugging of pores. As another example, it is often desirable to cool fluidized beds where exothermic reactions are occurring to prevent degradation of the bed materials or the initiation of undesired side reactions. In such cases, any improvement in cohesive powder fluid bed operation wherein the value of h can be increased is a major attraction since a smaller heat transfer area with its associated advantages of more economical heat transfer may be employed.

There is a considerable amount of literature on heat transfer characteristics of bubbling fluidized beds. An excellent summary by Xavier and Davidson (Fluidization, Second Edition, Academic Press, London, 1985) is attached with this specification. The bubbling fluidized bed behavior of Geldart type A and B powders is totally different from that of cohesive Geldart type C powder fluidized beds. The fluidization of cohesive, Geldart type C powders like phosphors, electrostatic toners, ultra fine ceramic powders, fine pharmaceutical powders, etc. is characterized by low powder mobility due to the bypassing of the fluidizing gas via the formation of channels. The channels are a network of vertical and inclined cracks. See Dutta et al., AIChE Symp. Ser. 276(86), 26, 1990; AIChE Symp. Ser. 281(87), 38, (1991).

The formation of channels of gas in fluidized beds of cohesive Geldart type C powder, instead of bubbles, is attributed to the dominance of inter particle forces over fluid dynamic drag forces. The presence of channels means that the entire bed weight is not supported by the pressure drop of the gas. The pressure drop of the fluidizing gas in cohesive powder fluidization is, therefore, smaller than the bed weight. The ratio of the two, called the normalized bed pressure drop, is thus smaller than unity for such systems while it is practically unity for bubbling beds. The more severe the bypassing of gas, the larger is the deviation in the normalized bed pressure drop from unity in cohesive powder fluid beds. Bubbling fluidized beds differ, therefore, from cohesive powder beds in that the latter have no bubbles, have lower than unity normalized bed pressure drop and have low powder mobility. The lack of bubbles and poor powder motion in such systems leads to very low values of the heat transfer coefficient h as compared to bubbling beds.

Due to such intrinsic differences between bubbling beds and cohesive powder fluidized beds, the heat transfer correlations and concepts developed in the literature for bubbling beds are not necessarily applicable to cohesive powder systems. All heat transfer information in the literature for bubbling systems are based on the presence of bubbles which are absent in cohesive powder fluidization.

Any improvement which significantly enhances the heat transfer characteristics in a fluidized bed of Geldart type C cohesive powder represents an advance in the art.

SUMMARY OF THE INVENTION

It is an object of the present invention to provide a method for enhancing the heat transfer characteristics of a fluidized bed of Geldart type C powder.

It is another object of the present invention to utilize the influence of the fluidizing gas type on the heat transfer characteristics of a fluidized bed of Geldart type C powder.

Other and additional objects of the invention will become apparent to one of ordinary skill in the art from the following specification and appended claims.

In accordance with the present invention, there is provided a method for enhancing heat transfer in a bed of powder comprising cohesive Geldart type C particles confined by a wall of a vertically oriented container and being fluidized by the upward flow of gas through the bed of powder. The method comprises transferring heat between the bed of powder and the wall of the container during fluidization of the particles, and, prior to fluidizing the particles, selecting the fluidizing gas so as to comprise a sufficient amount of helium, hydrogen, or mixtures thereof for obtaining a thermal conductivity of the fluidizing gas of at least four times that of nitrogen at the desired bed operating temperature for enhancing heat transfer between the wall and the bed.

BRIEF DESCRIPTION OF THE DRAWINGS

The invention will become more readily apparent from the following exemplary description in connection with the accompanying drawings, wherein.

DETAILED DESCRIPTION OF PREFERRED EMBODIMENTS

Figure 1:
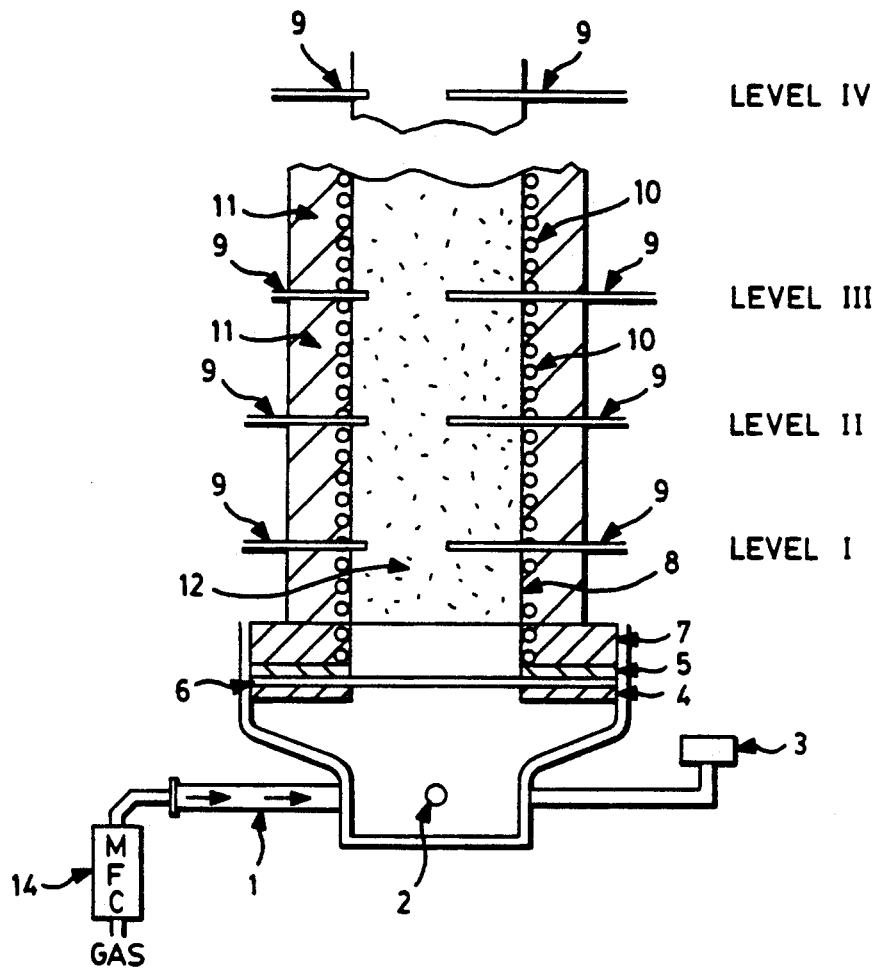
FIG. 1 is a schematic of the fluidized bed apparatus used in connection with the process of the present invention.

The method of the present invention is illustrated in conjunction with the apparatus shown in FIG. 1. Cohesive powder 12, a Geldart type C powder, is confined within a vertically oriented container 8 with upwardly flowing gases being evenly distributed into a bottom portion of the container 8 through a porous distributor 6 in the form of a gas permeable member. The distributor 6 which communicates with the plenum 7 for the flow of gas is held in a horizontal position transverse to the wall of the container 8 between respective plates 4 and 5. The temperature of incoming gas is monitored by thermocouple 2 and controlled by a heat exchanger 1 in the form of a gas heater. The pressure of gas in a gas source which communicates with powder in the bed through the distributor 6 is controlled by a mass flow controller 14 and monitored by a pressure transducer 3 associated with the plenum 2. The vertically oriented container or column 8 includes heat exchanging means 10 adjacent wall of the container 8. As illustrated in the FIG. 1, thermocouples 9 are positioned at various locations in the fluidized bed to measure the temperature.

The cohesive powder used in the method of the present invention is a Geldart type C powder which is difficult to fluidize. The powder is characterized by its small particle size of less than about 20 microns. As set forth in Geldart, supra (1984), dry cohesive powders have no clearly measurable minimum fluidization or bubbling velocity. To obtain the desired fluidization or expansion of the bed, the superficial velocity of the fluidizing gas is preferably at about 0.07 to about 0.14 meters per second. The superficial velocity is given with respect to the reference condition as measured at standard conditions of 294.1 K and 0.1 MPa. At higher velocities elutriation losses may undesirably increase while at lower velocities the mobility of bed particles may be undesirably low. A preferred range for the superficial velocity is from about 0.09 to about 0.11 meters per second. It is preferable to maintain the superficial velocity through the bed of powder of greater than about 0.08 meters per second. As set forth in Geldart, supra (1984), bubbles are virtually absent from the bed even at superficial gas velocities of 0.08 m s$^{-1}$.

Bed expansion in cohesive powders is caused by the proliferation and enlargement of horizontal and inclined cracks. Group C powders become more cohesive as the particle size is reduced. The cohesiveness of the powder has been correlated with the Hausner ratio which is the ratio of tapped to loosely packed bulk density. This ratio increases with increasing cohesiveness. The cohesive powders utilized in the present invention preferably have a Hausner ratio greater than about 1.4. The preferred technique for measuring the Hausner ratio is with a Hosakawa powder tester as set forth in Dutta et al, supra (1990). Typical cohesive powders may be either inorganic or organic and include fine powders like phosphors, electrostatic toners, ultra fine ceramic powders, and fine pharmaceutical powders.

The present invention is particularly suited for use with an inorganic powder comprising phosphor particles. The particular powder utilized in the detailed examples is a halophosphate phosphor, having the chemical formula $Ca_{10}(PO_4)_6(F,Cl):Sb:Mn$, a surface mean diameter and density of 8 $\mu$m and 3100 kg/m$^3$, respectively, and a Hausner ratio of about 1.5. The size and density of this material are the primary characteristics for categorizing it as a Geldart type C powder. The powder is blended with 0.5% by mass of Aerosil R972, a fine particle size hydrophobic silica which functions as a fluidizing aid. The role of such additives in cohesive powder fluidization has been discussed by Dutta et al, supra (1990).

The specific heat exchange means 10 utilized in the following detailed embodiment was a heating tape so that heat was transferred to the powder 12 in the bed through the heated wall. In this case, the wall temperature was higher than the temperature of the bed so that the temperature differential caused heat to flow from the wall to the bed. However, it is also contemplated that the bed may be desirably cooled by the method of the present invention, in which case, the temperature of the bed is higher than the temperature of the wall so that the temperature differential causes heat to flow from the bed to the wall. It is also contemplated that the relative temperature differential between the bed and the wall may fluctuate during the fluidization process so that the bed temperature may be sometimes higher and sometimes lower than the temperature of the wall. In this case, the bed temperature may be conveniently controlled by monitoring the bed and wall temperature, determining the temperature differential, and controlling the wall temperature so that the appropriate bed temperature can be attained due to heat transfer between the wall and the bed.

The change in bed temperature with time is due to heat transfer with the wall and with the gas passing through the bed. Heat exchange between the top surface of the expanded bed and the atmosphere above the bed are negligible. As hereinafter reported, in the case where the fluidizing gas is helium at the specific conditions reported, it would take about three times longer to increase the bed temperature over 50 K by utilizing only the heating effect of the incoming gas as compared to the heating effect of combined heating action from the wall and the incoming gas. Therefore, the focus of the present invention is on the wall to bed heat transfer.

In accordance with the principles of the present invention, prior to fluidizing the particles in the bed, a fluidizing gas is selected so as to comprise a sufficient amount of helium, hydrogen, or mixtures thereof for obtaining a thermal conductivity of the fluidizing gas of at least four times that of nitrogen at the desired bed operating temperature for enhancing heat transfer between the wall and the bed. Thus, at least a portion of the gas desirably includes helium, hydrogen or mixtures thereof. Hydrogen, although a reactive gas, is preferred for its high thermal conductivity. Although, helium has a lower thermal conductivity than hydrogen, it is preferred because of its non-reactive nature.

When the wall has a wall operating temperature different than the bed operating temperature so that heat is transferred between the bed and the wall in accordance with the temperature differential, it has been found that suitable selection of the fluidizing gas results in an improved heat transfer and, hence, improved temperature control of the bed. A blend of fluidizing gases may be suitably selected so as to have a heat transfer enhancing portion and a heat transfer diluent portion. The heat transfer enhancing portion comprises helium, hydrogen, or mixtures thereof and the remaining portion, the heat transfer diluent portion, comprises diluent gases which are utilized only in such an amount that the thermal conductivity of the resulting mixture does not decrease below at least four times that of nitrogen. The preferred diluent gases are nitrogen and neon. Neon is preferred due to is thermal conductivity which is greater than nitrogen. Nitrogen is preferred due to its commercial availablity.

The effective thermal conductivity of the fluidizing gas depends on the particular types of gases used. For the above mentioned gases, i.e. nitrogen, neon, helium and hydrogen, the ratio of thermal conductivity of each gas relative to nitrogen at 300 K is, respectively, 1.000, 1.887, 5.753, and 6.836. When used in the form of a pure gas, helium and hydrogen are the only gases which meet the criteria of having an effective thermal conductivity of at least four times that of nitrogen at a bed temperature of 300 K. Thus, to obtain the requisite thermal conductivity of four times that of nitrogen, the heat transfer enhancing portion of the fluidizing gas comprises helium, hydrogen, or mixtures thereof. The remaining portion can comprise nitrogen, neon, or mixtures thereof as a diluent gas provided the desired thermal conductivity of the gas is achieved.

When the fluidizing gas comprises a mixture of gases the effective thermal conductivity is determined by the rule of mixtures. As an approximation the linear mixing rule may be used as follows:

$$k_m = \Sigma k_i y_i$$

where $k_m$ is the mixture thermal conductivity
and $k_i$ is the thermal conductivity of gas i
and $y_i$ is the mole fraction of gas i in the mixture Reid et al. in "The Properties of Gases and Liquids" McGraw Hill, 4th Edition, p. 530, 1987 discuss methods for computing gas mixture thermal conductivities. All the four gases being considered here are non-polar. Reid et al. state that the thermal conductivity of a non-polar mixture of gases is lower than would be predicted from a mole fraction average and the deviation from a linear mixing rule is larger the greater the difference in molecular weights of the components. For more accurate calculations, the Wassiljewa equation with the Mason-Saxena modification is recommended by Reid et al. An example of a calculation of mixture thermal conductivity obtained from the linear mixing rule is given in the description which follows. However, in this regard for an accurate determination of thermal conductivity, it should be noted that the relative thermal conductivity of gases with respect to nitrogen changes with changes in temperature so that themal conductivity of the gas at operating temperature of the bed should be preferably considered for the above calculation. For example, the ratio of the thermal conductivity of neon, helium and hydrogen relative to nitrogen at 300 K and at 600 K is, respectively, 1.887 to 1.734, 5.753 to 5.570, and 6.836 to 6.620. For instance a typical mixture of gases having a thermal conductivity of 4 times that of nitrogen at 600 K and calculated using the linear mixing rule comprises 28.25% nitrogen, 10% neon, 51.74% helium, and 10% hydrogen.

It is also possible, for example, to develop a three component blend: hydrogen, helium and neon, which will have a mixture thermal conductivity at least four times that of nitrogen. This blend may be used to increase the wall to bed heat transfer coefficient during cohesive powder fluidization. In the case where the gas is 100% helium and for the same temperature driving force between the wall and the bed, the wall to bed heat transfer coefficient with helium as the fluidizing gas is about 45% higher than that with nitrogen.

DETAILED EXAMPLE OF A SPECIFIC EMBODIMENTS

FIG. 1, as more specifically described, includes a stainless steel (SS) column 8 with an ID of 0.1016 m and a height of 2.1336 m. The column 8 is equipped with a four zone external resistive heat exchanging means 10 in the form of heating tape which is a heavy insulated Thermolyne/Briskheat variety of dimensions 0.013×2.44 m. Each zone is capable of a maximum heating duty of 416 W @115 V. The heating tape is covered by two layers of insulating material 11, a Fiberfrax rope of diameter 0.0127 m and one layer of insulating Fiberfrax blanket of thickness 0.0508 m. The insulating material 11 has a blanket density and thermal conductivity of 96 kg/m$^3$ and 0.073 W/m.K respectively. The distributor 6 is a porous plate with a mean pore size of 5 μm. The incoming fluidizing gas can be heated to a maximum of 773 K by a dedicated in-line heat exchanger 10.

Figure 2:
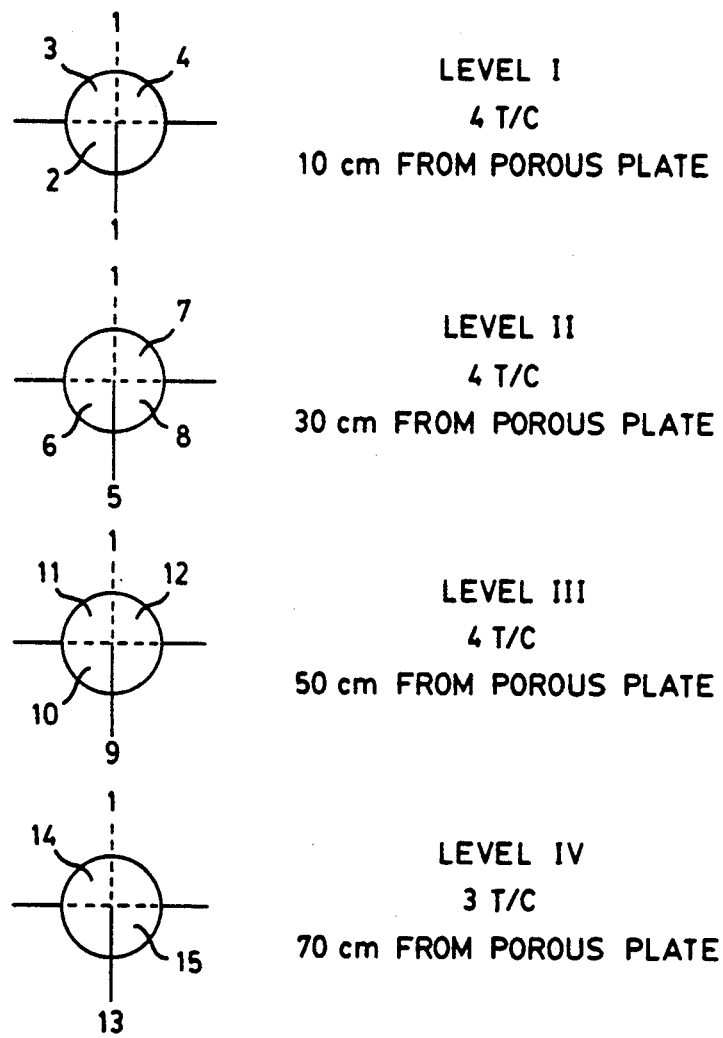
FIG. 2 shows the thermocouple layout.

A total of sixteen type J thermocouples 9 in stainless steel sheaths are used. All thermocouples are calibrated in the range 294 K to 800 K using a Techne DB 700 block calibrator. Fifteen thermocouples are located at four axial stations in the column volume for spatially resolved axial and radial temperature profiles, while one thermocouple is positioned in the plenum chamber with the tip of the sheath in the line of the incoming fluidizing gas. FIG. 2 shows the thermocouple layout. Every axial station, with the exception of the topmost level which has three, has four thermocouples. Of these four thermocouples, one is placed at the center line of the column while the remaining are located in individual quadrants with their tips at a radial distance of 0.0254 m. The thermocouples are laid out such that axial profiles of bed temperature can be measured at five distinct radial positions, one of which is the center line of the column while the others are located at a radial distance of 0.0254 m in each of the four quadrants. As an example, thermocouples 1, 5, 9 and 13 provide the axial temperature profile at the center line of the column, while thermocouples 2, 6 and 10 measure the axial profile in the first (numbered counterclockwise) quadrant.

A Heise optical pressure transducer 3 monitors the gauge pressure in the plenum. The pressure port is located diametrically opposite the gas inlet to the plenum. Fluidizing gas flow is regulated by a mass flow controller 14. The sixteen thermocouples are interfaced to a Metrabyte EXP-16 multiplexer board which is connected to a DAS8 A/D board in an IBM 7531 computer. The pressure transducer 3 and mass flow controller 14 are interfaced to the DAS8 board via a break out board outside the computer. Data from these eighteen channels is collected in real time using LabTech Notebook software. Information about process variables is also displayed during data collection.

Nitrogen and Helium are evaluated in the following discussion. Relevant physical properties of the gases at 294.1 K (standard conditions) and 600 K are listed in Table 1. Nitrogen is about seven times as dense as helium and is about 10% less viscous than the latter over this temperature range. In addition, the specific heat and thermal conductivity of helium is at least five times that of nitrogen. The mass flow controller 14, calibrated at the factory for $N_2$, is also used for He with a vendor provided flow coefficient of 1.39. The $N_2$ full scale for the mass flow controller 14 is 0.833 E-3 m$^3$/s (50 slm) at standard conditions of 294.1 K and 0.1 MPa.

The distributor plate 6 is calibrated for pressure drop in the absence of powder, using each gas in turn at both standard conditions and at an elevated temperature. Powder is then introduced into the column, the bed fluidized with each of the gases in turn at ambient temperature and the fluid bed pressure drop and pressure fluctuations studied. The bed is then heated and the temperature profiles, wall to bed heat transfer coefficient and bed pressure drop investigated for each gas in turn.

CALIBRATION OF PLATE WITH NITROGEN

Figure 3:
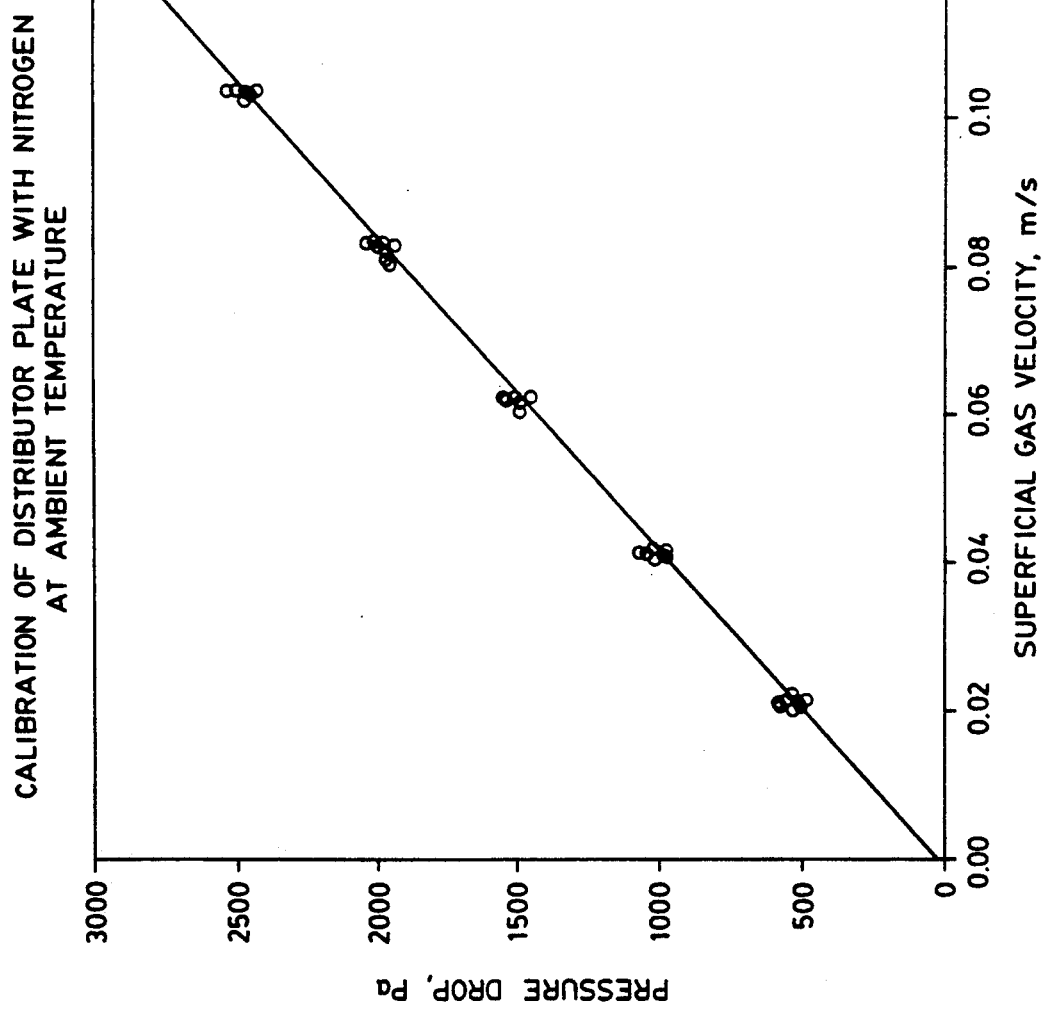
FIG. 3 shows the distributor plate pressure drop versus gas superficial velocity for incoming nitrogen at about standard temperature.

FIG. 3 shows the distributor plate pressure drop versus gas superficial velocity for incoming nitrogen at about standard temperature. The line of best fit to the data is described by the equation $\Delta P_{d,s} = 23,434.26\,U + 27.43$, where multiple $R^2$ or the regression coefficient is 0.9995. The experiment is conducted by collecting plenum pressure drop and mass flow controller 14 flow rate data at different settings of the flow controller.

Figure 4:
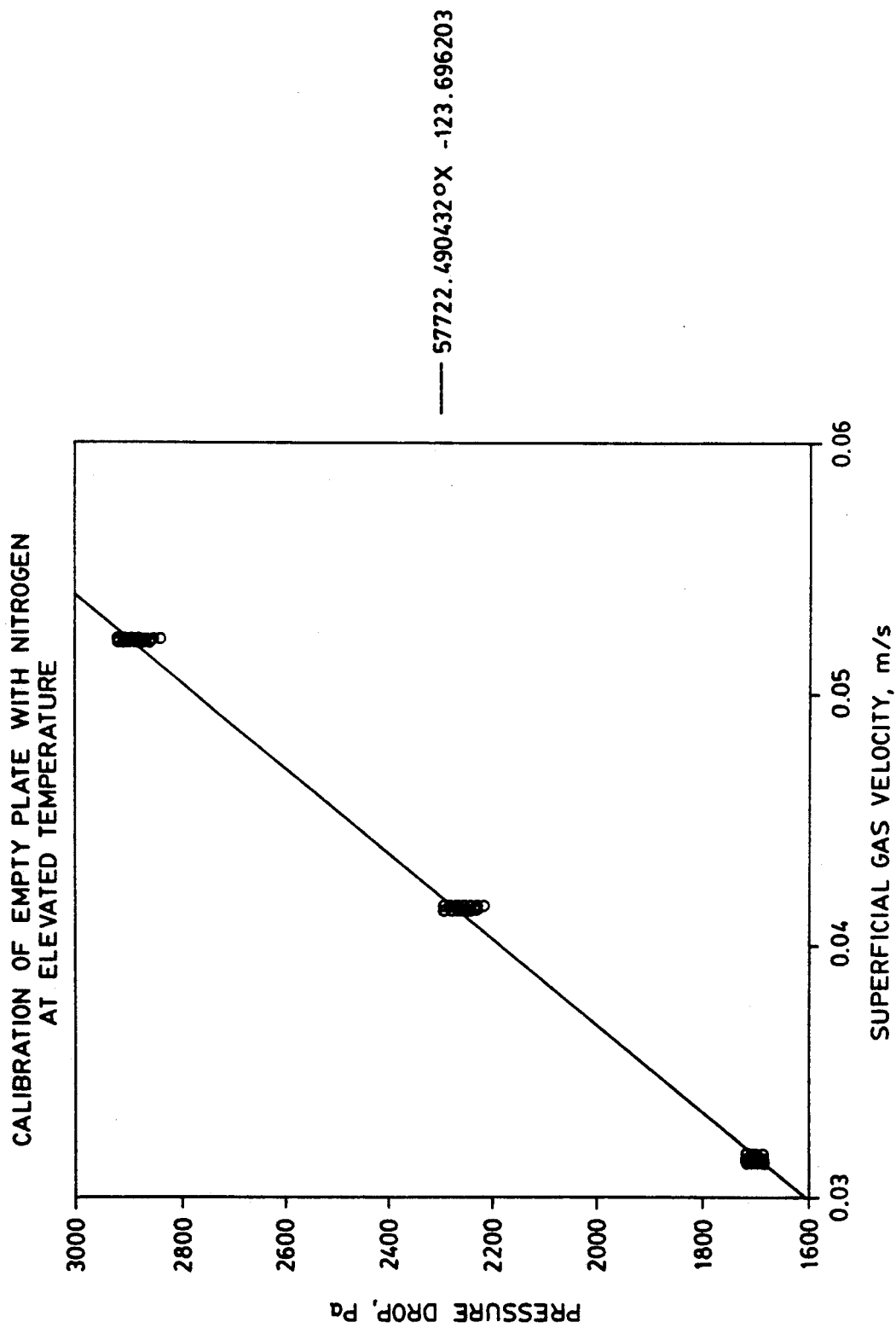
FIG. 4 shows the distributor plate pressure drop versus gas superficial velocity for incoming nitrogen at an elevated temperature.

FIG. 4 shows the distributor plate pressure drop versus gas superficial velocity for incoming nitrogen at an elevated temperature. The line of best fit to the data is described by the equation $\Delta P_{d,h} = 57722.49\,U - 123.69$, where multiple $R^2$ is 0.998. The experiment is conducted by heating the incoming gas and collecting data in a fashion similar to that described earlier. The inline heater voltage is controlled to achieve minimal variation in the temperature of the hot plenum gas. Over the duration of the run, the mean plenum temperature is 619.4 K while the standard deviation is 3.6 K.

The mass flow controller 14 measures all flow at standard conditions of temperature and pressure, 294.1 K and 0.1 MPa, thereby eliminating the need for any corrections for changes in the physical properties of the gas. U is computed from a knowledge of the cross sectional area of the column and the mass flow controller 14 flow rate. It follows, therefore, that the computed value of U always refers to standard conditions. Equal values of U in FIGS. 3 and 4 refer, therefore, to identical mass flow rates of nitrogen. As expected, a given mass flow rate of gas results in a higher distributor pressure drop when the gas temperature is elevated.

The increase in $\Delta P_d$ with $T_{g,p}$ is correlated with $\mu_g$ in the following fashion. The previous expressions for $\Delta P_{d,s}$ and $\Delta P_{d,h}$ yield $\Delta P_{d,h}/\Delta P_{d,s} = 2.2$ for $U = 0.03126$ m/s (30% setting on the mass flow controller 14). The ratio of $\mu_g$ between 619.4 K and 294.1 K, $\mu_h/\mu_s$, is 1.7. Expressing $\Delta P_{d,h}/\Delta P_{d,s}$ as $(\mu_h/\mu_s)^x$, one finds that $x = 1.486$. The distributor pressure drop at an arbitrary plenum temperature $T_{g,p}$ can now be found from a knowledge of $\Delta P_{d,s}$ and $(\mu_h/\mu_s)^x$ where $\mu_h$ is evaluated at $T_{g,p}$. Although the choice of U for computation of x is guided by the fact that the hot powder bed fluidization is carried out at this particular value of U, the sensitivity of x to U is minimal.

POWDER FLUIDIZATION WITH NITROGEN AT STANDARD TEMPERATURE

Figure 5:
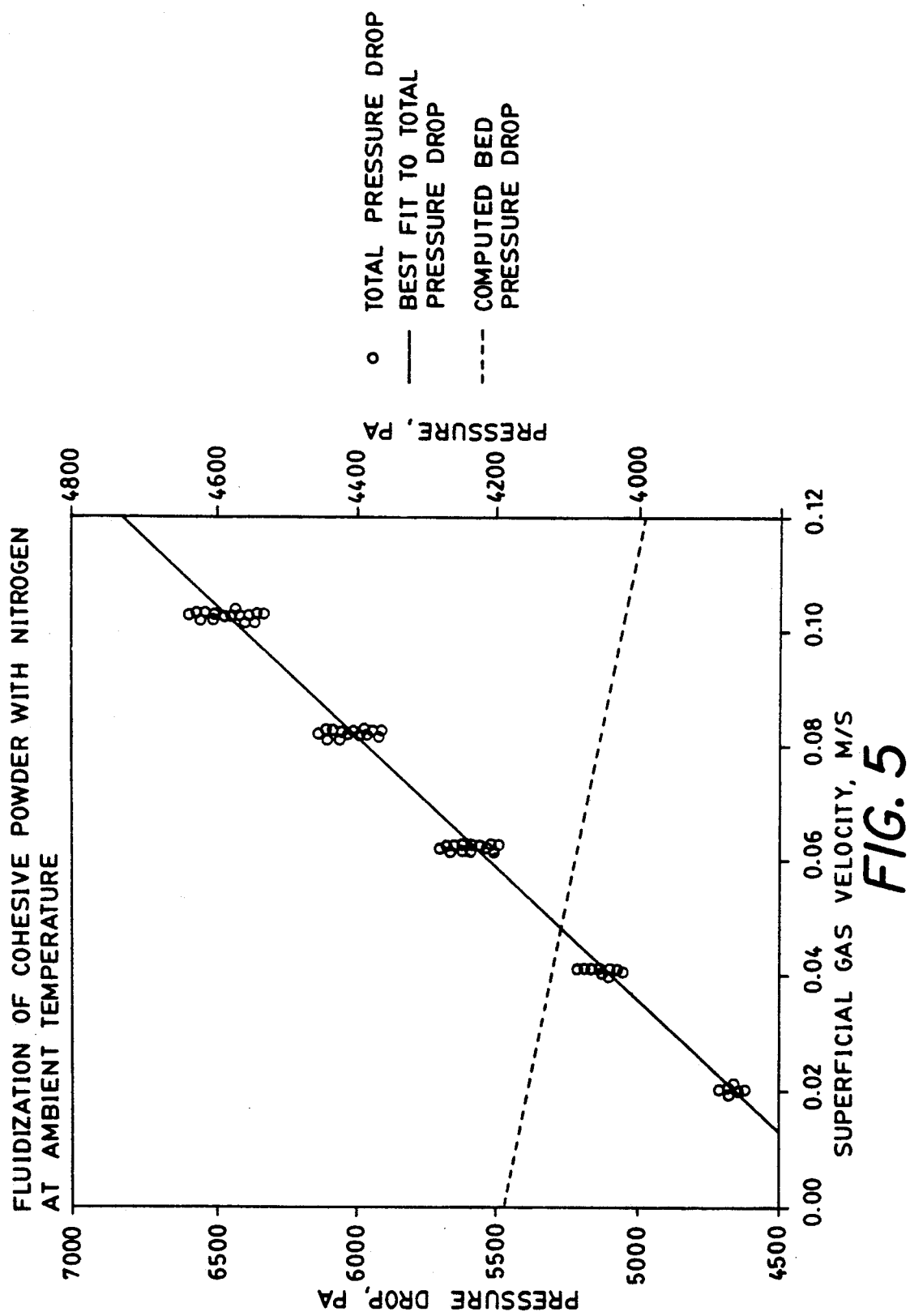
FIG. 5 shows the dependence of the total pressure drop on gas velocity, described by the expression $\Delta P_t = 21801.20\ U + 4215.64$ where multiple $R^2$ is 0.9935.

A mass of 3.5 kg of the powder is introduced into the column. FIG. 5 shows the dependence of the total pressure drop on gas velocity, described by the expression $\Delta P_t = 21801.20\,U + 4215.64$ where multiple $R^2$ is 0.9935. The experiment is conducted by increasing the mass flow controller 14 setting in steps of 20% to a maximum of full scale. The fluctuations in $\Delta P_t$ increase with U, the standard deviation in the signal varying from about 25 Pa at U=0.02 m/s to about 70 Pa at full flow. Expressed as a percentage of the mean $\Delta P_t$, the variation is from 0.55% to about 1.07%. The total pressure drop is related to the distributor pressure drop and the bed drop by the relation: $\Delta P_t = \Delta P_{d,s} + \Delta P_b$. The contribution from $\Delta P_{d,s}$, which has been obtained previously, is subtracted in order to compute $\Delta P_b$. This results in the relation: $\Delta P_b = 4188.21 - 1633.06\,U$, which is also shown in FIG. 5. For standard temperature operation, cohesive powders of the type used here are best fluidized when U is about 0.1 m/s at which bed drop $\Delta P_b = 4024.9$ Pa. Ideally, a mass of 3.5 kg of powder fluidized in the present column would result in a $\Delta P_b$ of 4294 Pa. This implies an operating $\Delta P_b$ which is 93.7% of ideal and is a conservative number given that this calculation assumes that the mass of the bed at the end of the run is substantially unchanged from that at the beginning. In reality, losses due to elutriation will reduce the bed inventory over time so the final bed mass is lower than 3.5 kg. It is estimated that about 100 g or 2.85% of the initial bed mass is lost over the course of the run.

Elutriation loss is directly related to the operating value of the gas velocity and $U_t$. The concept of $U_t$ is not readily applicable to type C materials because the cohesive forces are difficult to quantify and incorporate into standard equations for $U_t$. In addition, the nature of cohesive powders does not allow for an easy identification of the particle size of the fluidized material. The effective size of the fluidized material is usually always larger than that measured outside of the bed environment by techniques such as laser diffraction. With these caveats in mind, a lower bound estimate of $U_t$ will be made. A dimensionless equation from Yates, J. G., *Fundamentals of Fluidized-bed Chemical Processes*, Butterworths (1983) is used:

$$C_d Re_t^2 = (4d^3 g \rho_g \rho_p)/3\mu_g^2 \qquad (1)$$

$$U_{mf} = \rho_p d^2 g / 1980 \mu_g \qquad (2)$$

It follows from Equation (1) that $Re_t$ is 0.00326 and $U_t$ is 0.006 m/s which is about 16 times smaller than U. An estimate of $U_{mf}$ can also be made using Equation (2) from Yates, supra, bearing in mind that its applicability is subject to the same issues as have been raised for $U_t$. This yields an $U_{mf}$ of 0.056 E-3 m/s.

POWDER FLUIDIZATION WITH NITROGEN AT ELEVATED TEMPERATURE

A mass of 3.9 kg of powder is introduced into the column, and a flow of gas with U=0.03126 m/s (30% of full scale of the mass flow controller 14) established at standard conditions of temperature. Next, all the four variacs powering the four section heating tape are switched on at a voltage of 70 V. The inline heater for the fluidizing gas is activated at the same time. Owing to a computer related issue, data acquisition was started 900 s after the heating was initiated. The actual run time is, therefore, greater than the data acquisition time by this amount.

Figure 6:
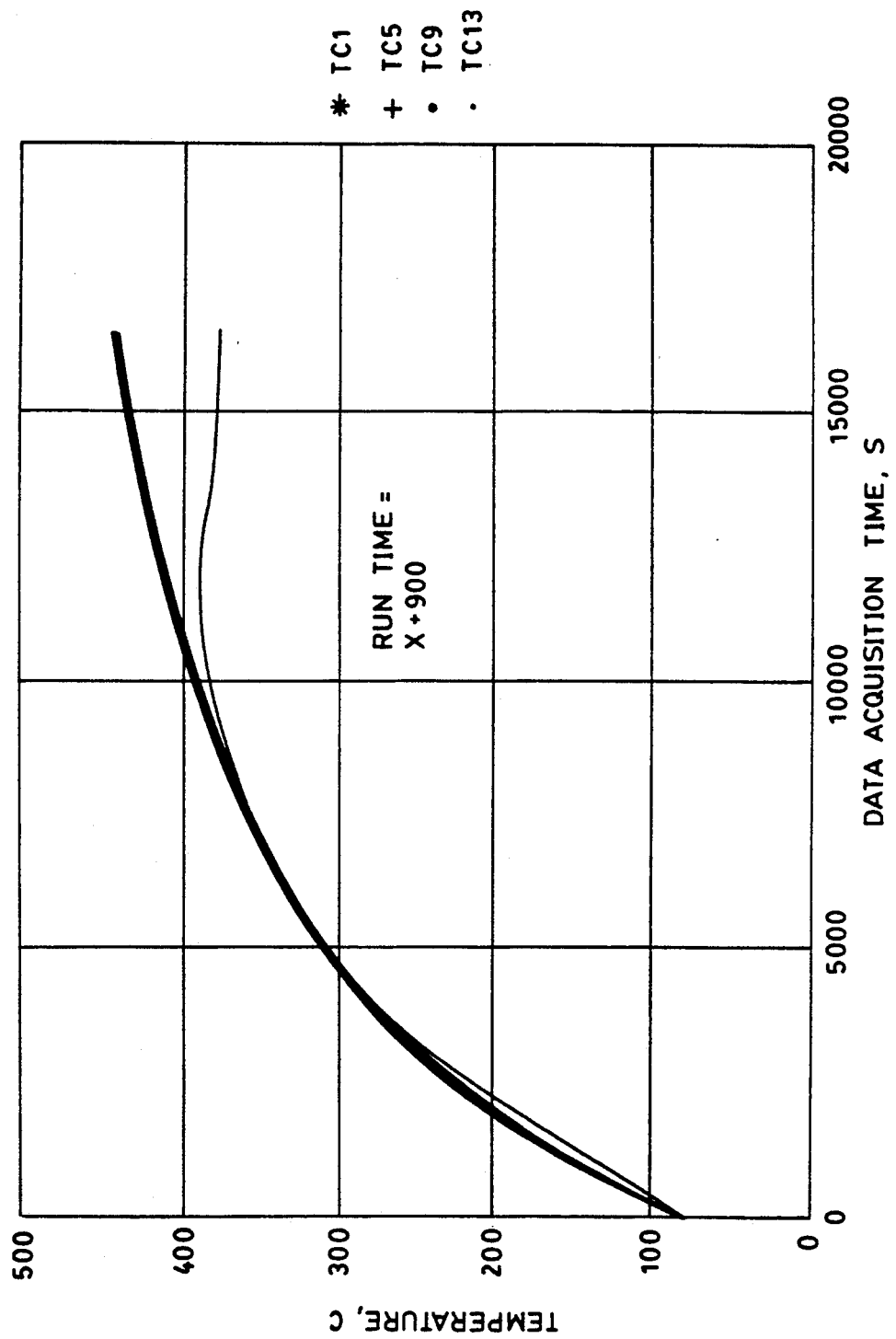
FIG. 6 shows axial temperature profiles at the center line of the column.

Axial temperature profiles at the center line of the column are shown in FIG. 6. There is excellent uniformity in temperature for a distance of at least 0.5 m above the distributor plate. The temperature reflected by thermocouple 13, located 0.7 m above the distributor, agrees with the others until a data acquisition time of about 7500 s after which it starts to trail behind the lower zone thermocouple. This behavior of thermocouple 13 is explained by elutriation loss which lowers the height of the expanded bed below 0.7 m thus exposing that thermocouple to the freeboard where a smaller solids loading produces a lower temperature.

Figure 7:
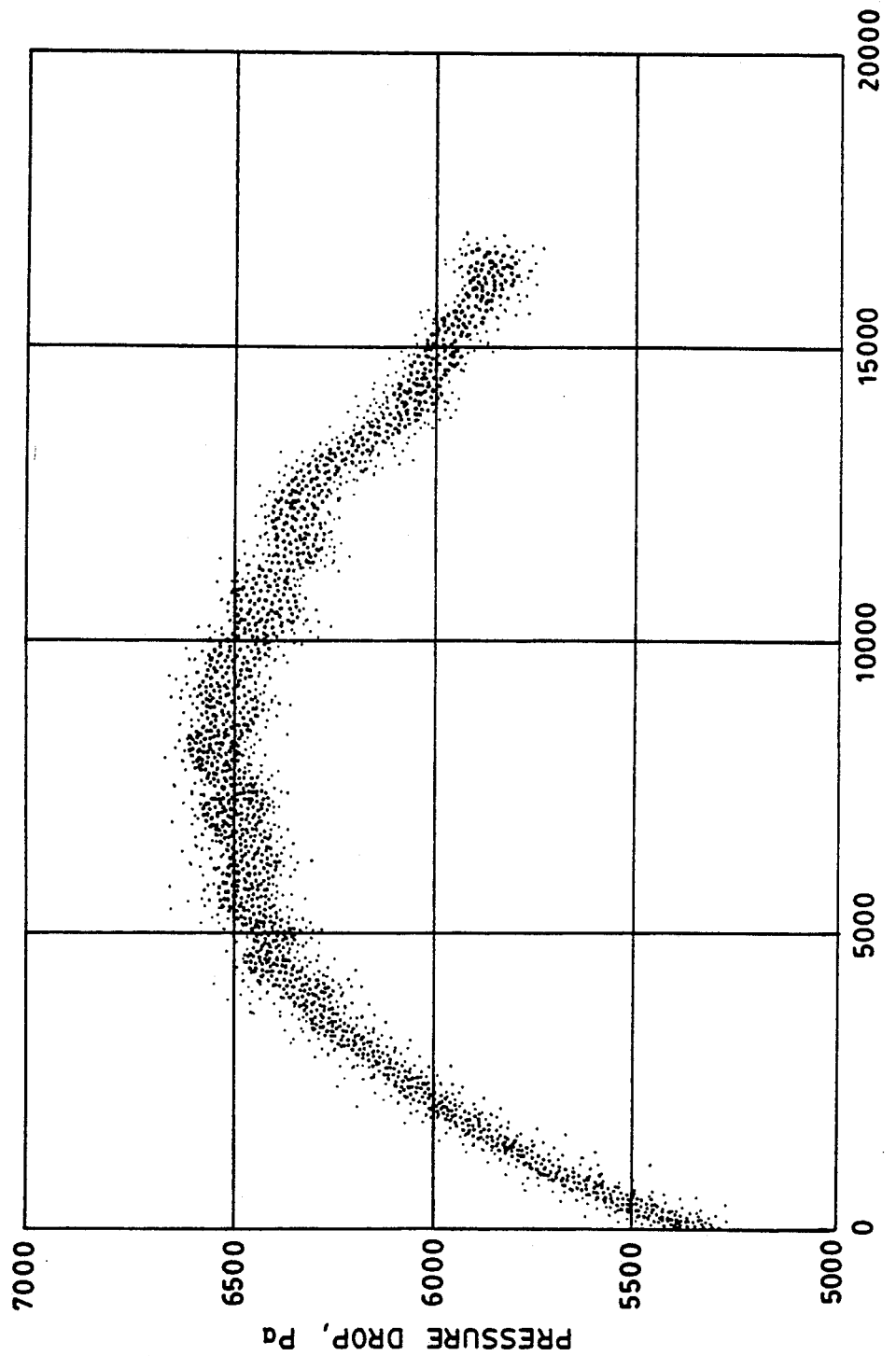
FIG. 7 shows the profile of the total bed pressure drop, $\Delta P_t$, as a function of data acquisition time.
Figure 8:
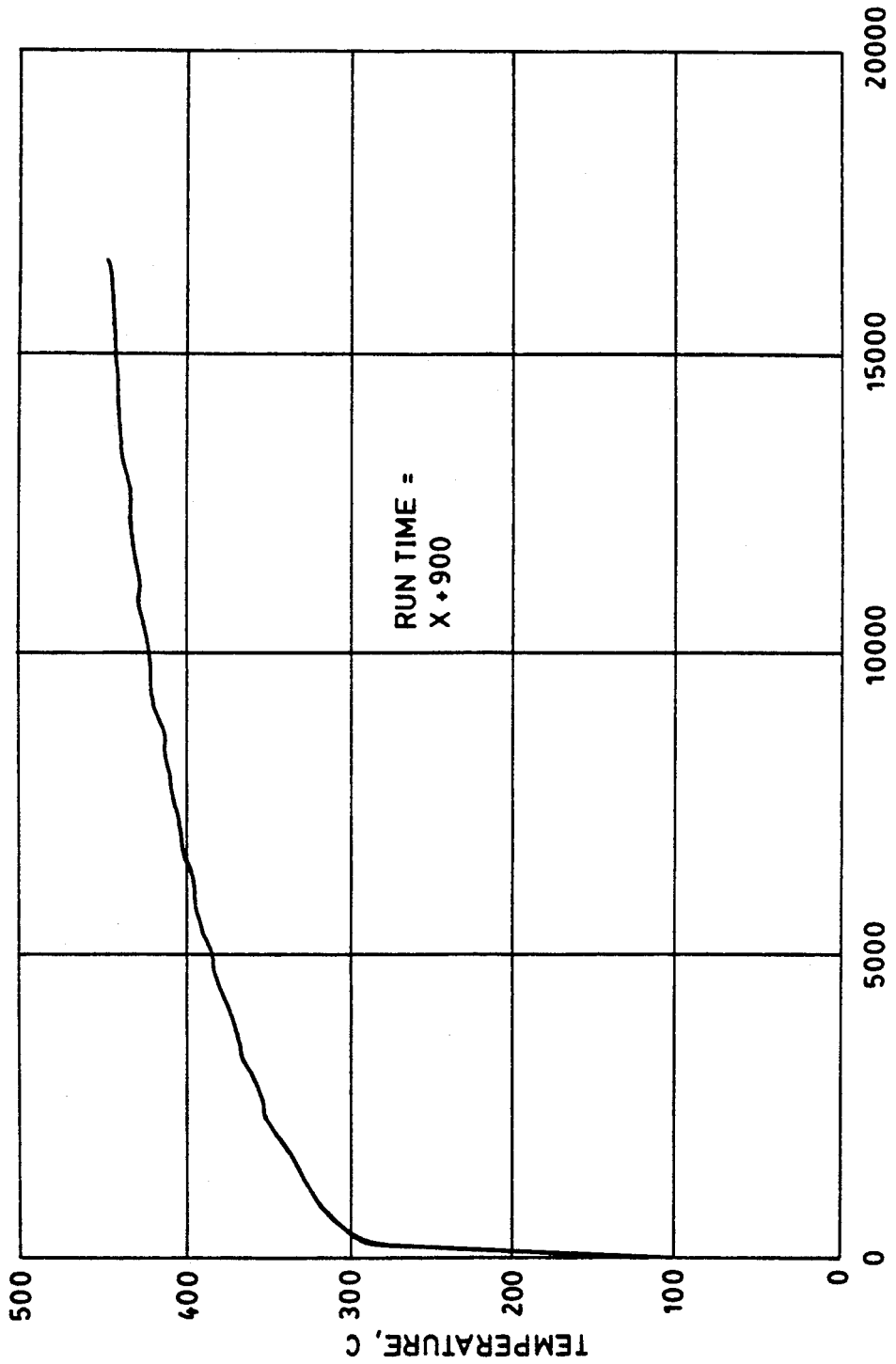
FIG. 8 shows the plenum gas temperature profile.
Figure 9:
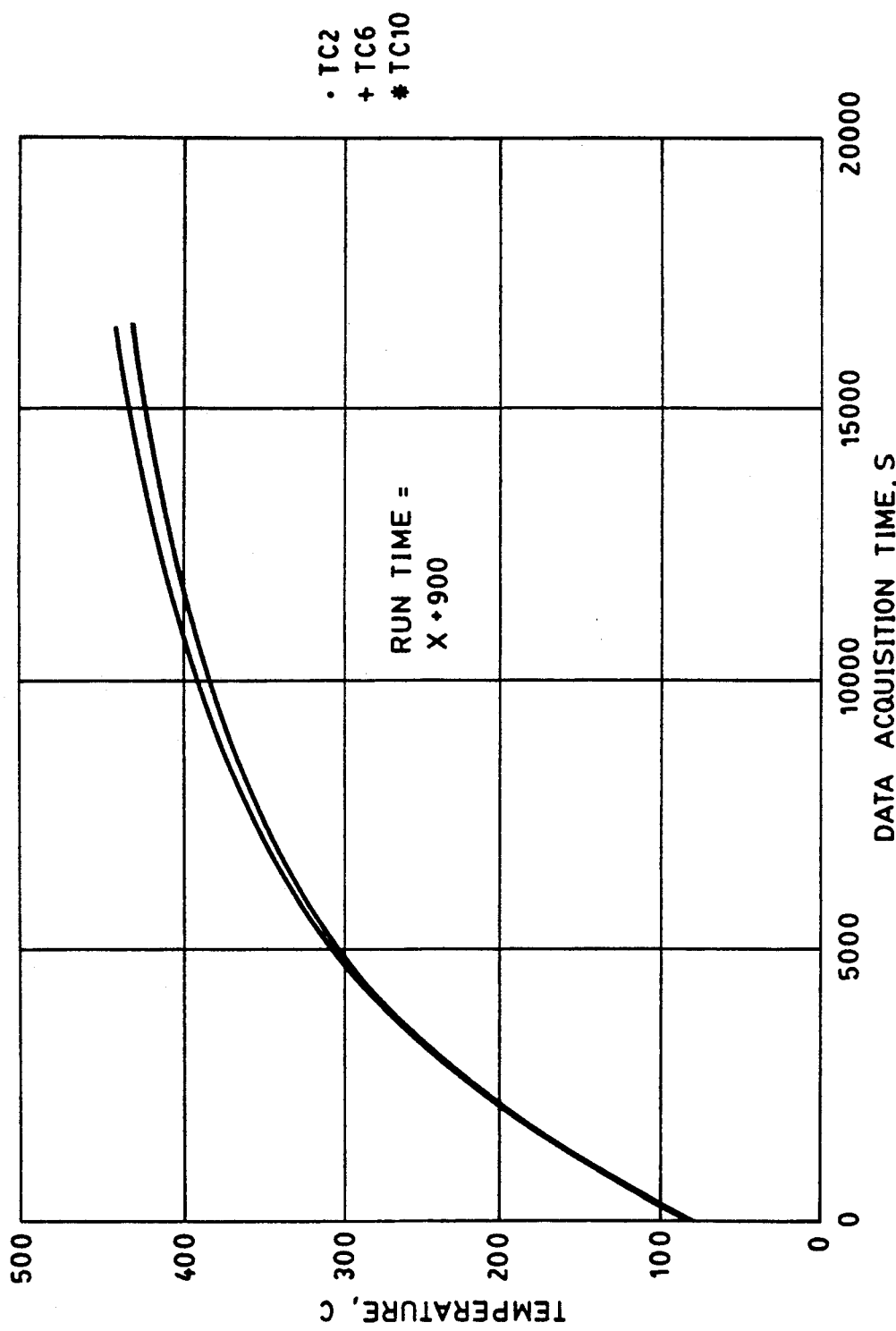
FIG. 9 shows axial temperature profiles at the radial stations in the first quadrant.
Figure 10:
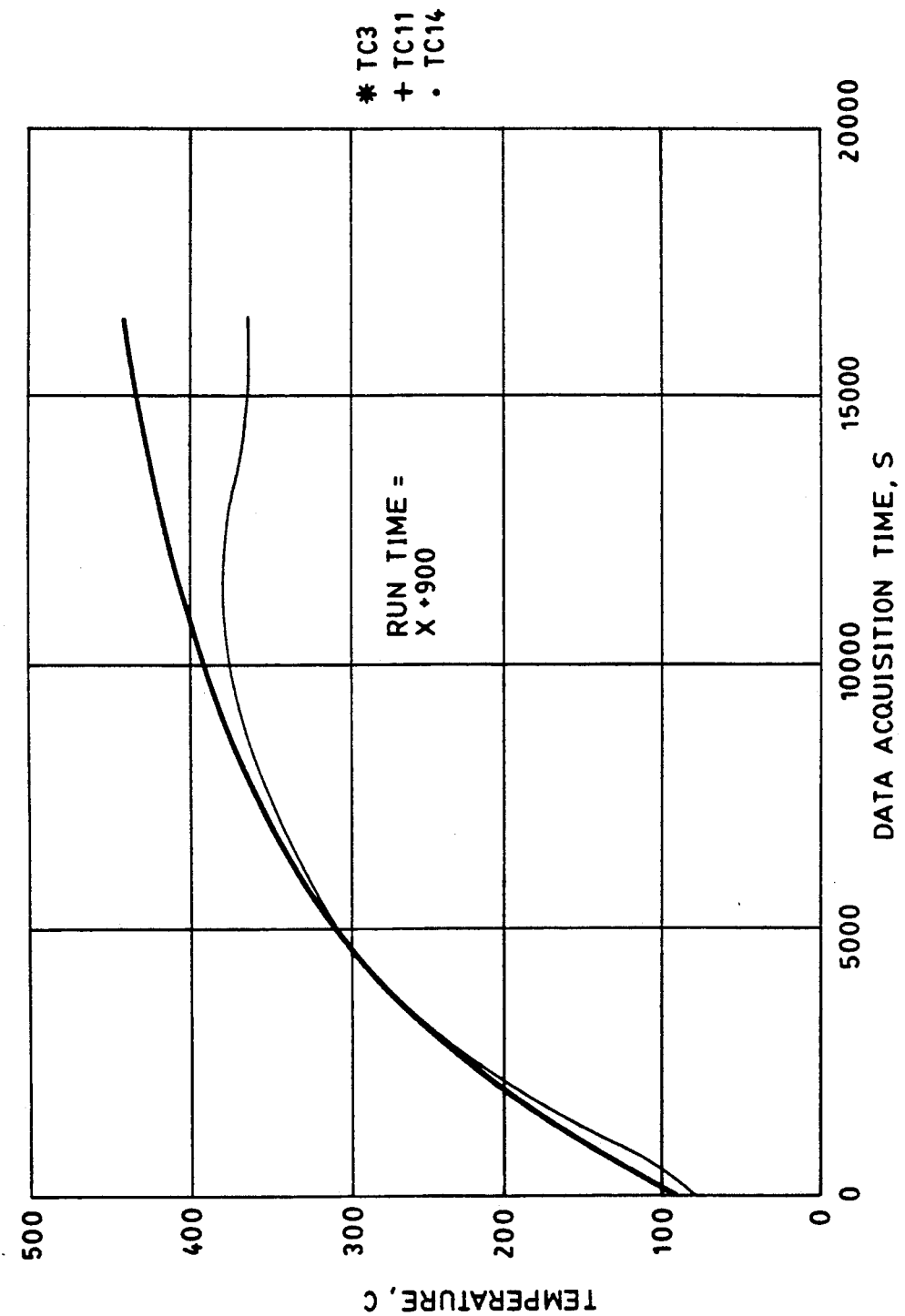
FIG. 10 shows axial temperature profiles at the radial stations in the second quadrant.
Figure 11:
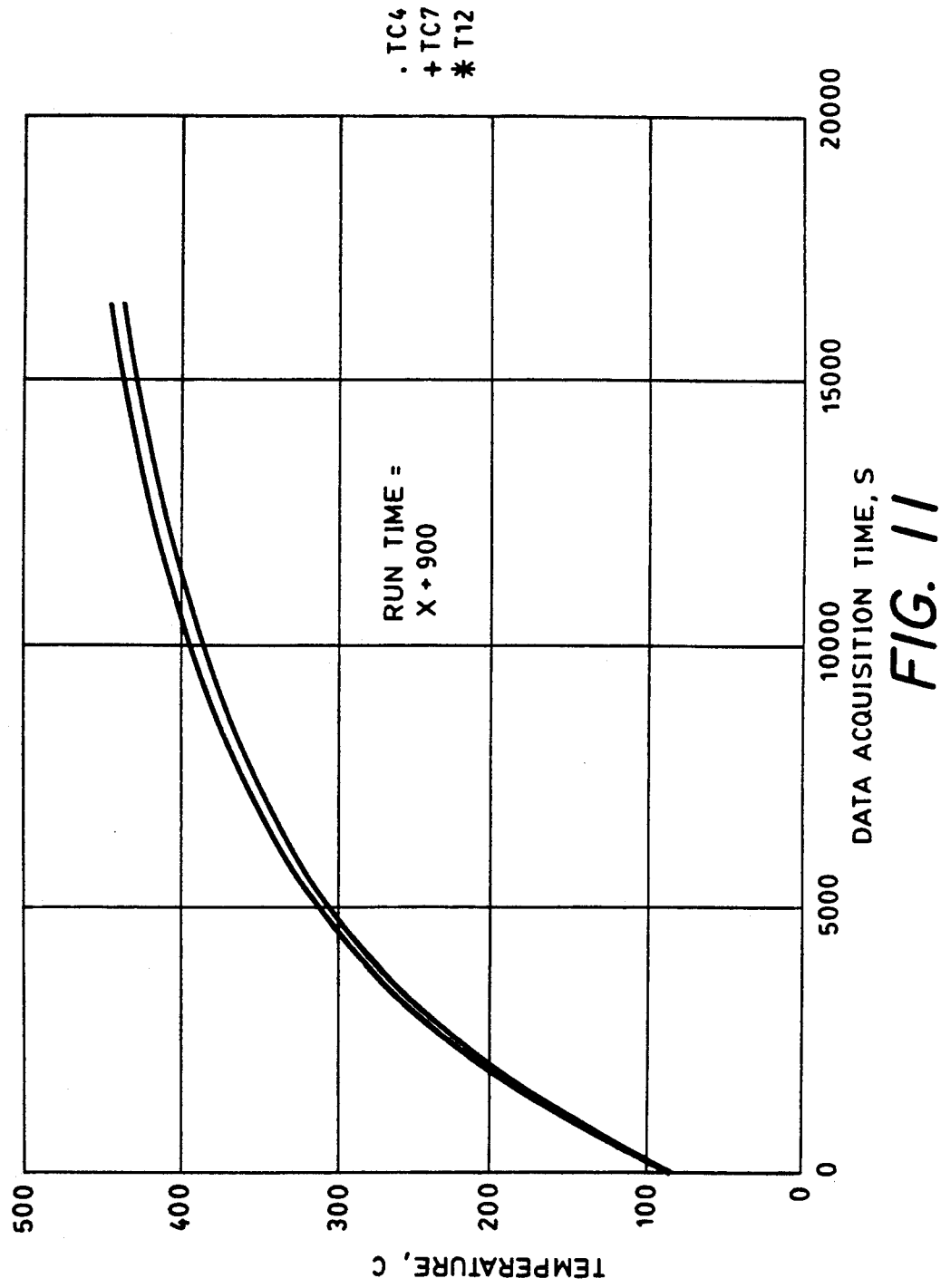
FIG. 11 shows axial temperature profiles at the radial stations in the third quadrant.

This explanation is supported by bed pressure drop observations. FIG. 7 shows the profile of the total bed pressure drop, $\Delta P_t$, as a function of data acquisition time. $\Delta P_t$ shows an increase until a data acquisition time of about 7500 s after which it starts to decrease. This decrease begins at about the same time as thermocouple 13 starts to depart from the lower thermocouple readings. $\Delta P_t$ is the summation of $\Delta P_{d,h}$ and $\Delta P_b$. The former is quickly established since $\Delta P_{d,h}$ is a function of the plenum gas temperature which, as shown in FIG. 8, rapidly rises to about 75% of its final value. The gradual increase in $\Delta P_t$ is, therefore, attributed to a gradual development of $\Delta P_b$ probably due to the improvement with temperature in the distribution of the gas in the bed. As the bed temperature increases, the effective gas velocity also increases until at a data acquisition time of about 7500 seconds, or equivalently an average bed temperature of about 630 K, elutriation losses start to reduce $\Delta P_b$ more than the improved gas flow increases $\Delta P_b$. The drop in $\Delta P_b$ due to elutriation, for data acquisition time values above about 7500 seconds, causes a progressive decrease in $\Delta P_t$ as observed in FIG. 7.

Figure 12:
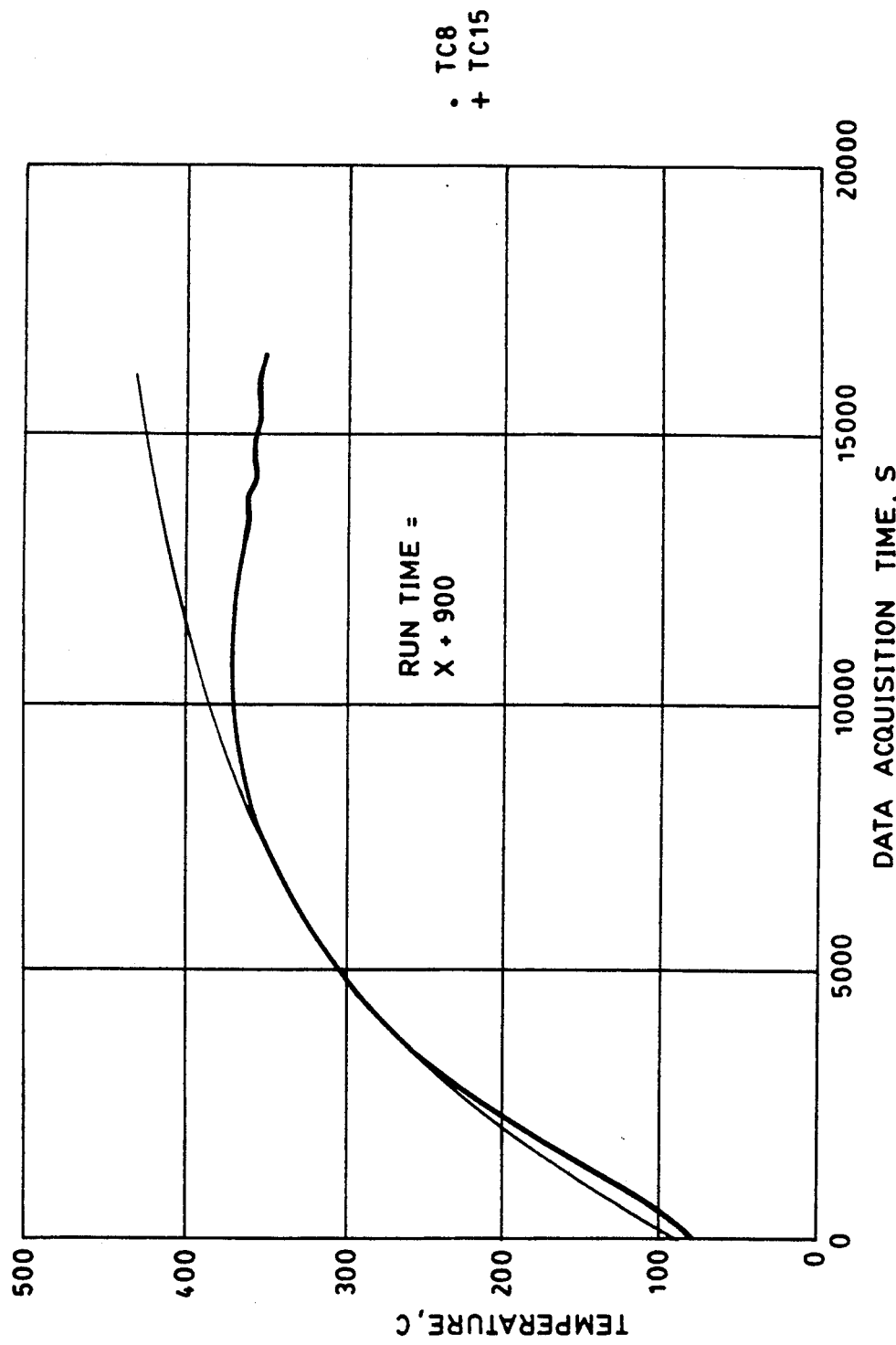
FIG. 12 shows axial temperature profiles at the radial stations in the fourth quadrant.

The axial temperature profiles at the radial stations in the four quadrants are shown in FIGS. 9 through 12. There is good uniformity in temperature in quadrant 1 as evidenced in FIG. 9. Quadrant 1 does not include any thermocouple beyond a height of 0.5 m. These thermocouples, therefore, are not affected by changes in bed height due to elutriation losses. In quadrant 2 displayed in FIG. 10, while thermocouple 3 and 11 show good agreement, thermocouple 14 departs from them beyond a data acquisition time of about 7500 seconds due to elutriation as explained earlier. In quadrant 3 all the thermocouple are always in the bed and, as in quadrant 1, show very good uniformity in temperature as evidenced in FIG. 11. Quadrant 4 has two thermocouples, thermocouple 8 and 15 whose profiles are shown in FIG. 12. While thermocouple 8 is in the bed, thermocouple 15 is exposed to the freeboard for data acquisition time exceeding about 7500 seconds. The temperature study indicates good uniformity throughout the volume of the heated fluidized bed. In addition, it shows a distinct difference in temperature between the dense bed and the lean phase freeboard just above it. In particular, the region of the freeboard just above the bed is lower in temperature than the bed by about 75 to 80 K.

The behavior of $\Delta P_t$ with time, FIG. 7 has been discussed previously. $\Delta P_t$ is the summation of $\Delta P_{d,h}$ and $P_b$. In order to calculate $\Delta P_b$ prior to the onset of significant elutriation, it is necessary to know the contribution of $\Delta P_{d,h}$ to $\Delta P_t$. The approximate value of data acquisition time beyond which $\Delta P_t$ starts to be affected by elutriation is 7500 seconds, at which time $T_{g,p}$ (from FIG. 8) is about 693 K and $\Delta P_t$ is about 6500 Pa. $\Delta P_{d,h}$ at 693 K is found by using the previously developed relation $\Delta P_{d,h}/\Delta P_{d,s}=(\mu_h/\mu_s)^x$ where x is 1.486. For U=0.03126 m/s, $\Delta P_{d,s}$ is 760 Pa which yields a value of 1863.75 Pa for $\Delta P_{d,h}$. Knowing $\Delta P_t$ and $\Delta P_{d,h}$, $\Delta P_b$ is found to be 4636.25 Pa. The ideal bed pressure drop for an initial inventory of 3.9 kg is 4784.75 Pa, which implies that the operating bed pressure drop prior to the onset of significant elutriation is about 96.9% of ideal.

The increase in bed temperature with time is due to heat transfer from the wall and heat convected in by the hot plenum gas. Heat losses to the environment from the top surface of the expanded bed are neglected. This results in the following formulation:

$$M_sC_{ps}(dT/dt)=hA(T_w-T)+m'C_{pg}(T_{g,p}-T)$$

which may be written as, $$(dT/dt)+FT=G \qquad (3)$$

where, $F=(hA+m'C_{pg})/M_sC_{ps}$ and
$G=(hAT_w+m'C_{pg}T_{gp})/M_sC_{ps}$

Attention is focused on a region of time fixed by a data acquisition time between 5000 and 7500 s. It has been explained earlier that elutriation losses are minimal below a data acquisition time of 7500 s. By considering a time domain below the critical data acquisition time, $M_s$ can be considered constant which makes the denominator of parameters F and G independent of time. A reasonably constant bed inventory also translates to a substantially unchanged A over the time period of interest. Furthermore, $T_{gp}$ and $T_w$ vary little over the 2500 s interval considered. These considerations imply that parameters F and G may be considered to be reasonably independent of time over this data acquisition time interval.

Values of the relevant variables used in the evaluation of F and G are:

A=0.2282 m$^2$ for an expanded bed height of 0.72 m, m'=0.29 E-3 kg/s, $C_{pg}=1.075$ kJ/kg.K, $C_{ps}=1.045$ kJ/kg.K and $M_s=3.9$ kg. thermocouple #5 is chosen to represent the bed temperature, T, which over the data acquisition time domain under consideration changes from 579.2 K to 630.1 K with a time mean temperature of 606.5 K and a rate of increase of 0.02 K/s. During this same interval, $T_w$ and $T_{gp}$ are about 628 K and 673 K respectively. It follows from Equation 2 that h=12.4 W/m$^2$.K. This is significantly lower than the values of h measured in bubbling fluidized beds.

It is interesting to calculate the time taken to change the bed temperature if the bed mass were being heated solely by the incoming hot gas. The appropriate heat transfer equation would then be:

$$M_sC_{ps}(dT/dt)=m'C_{pg}(T_{g,p}-T)$$

from which it can be shown that, $$ln\{[T_{g,p}-T_1]/[T_{g,p}-T_2]\}=(m'C_{pg})t/(M_sC_{ps}) \qquad (4)$$

It follows from Equation 4 that to increase the bed temperature from $T_1=579.2$ K to $T_2=630.1$ K with $T_{g,p}=673$ K would take about 10,227 seconds as compared to 2500 seconds under the combined heating action from the wall and the incoming gas. This serves to underscore the importance of the wall to bed heat transfer.

CALIBRATION OF PLATE WITH HELIUM

Figure 13:
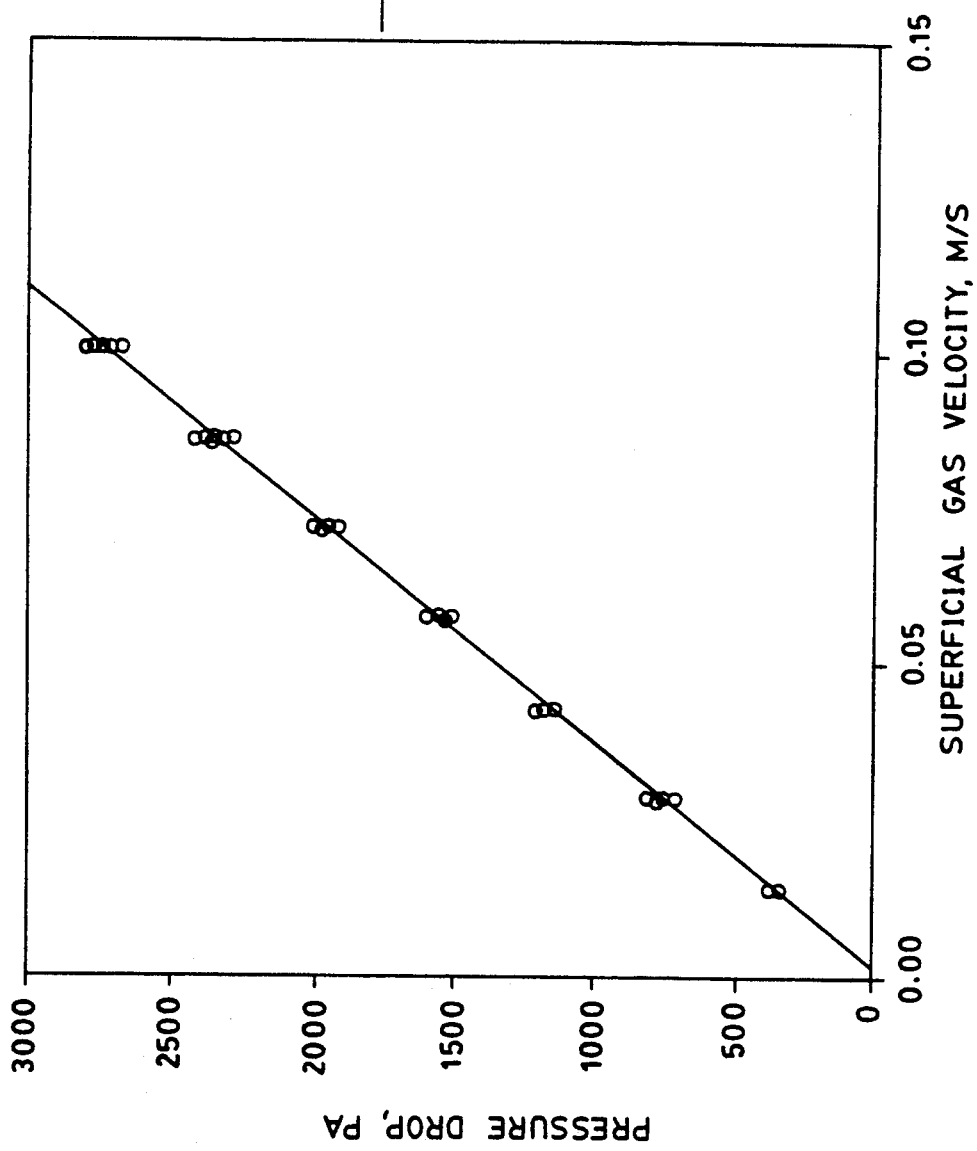
FIG. 13 shows $\Delta P_{d,s}$ versus U for incoming helium at about standard temperature.
Figure 14:
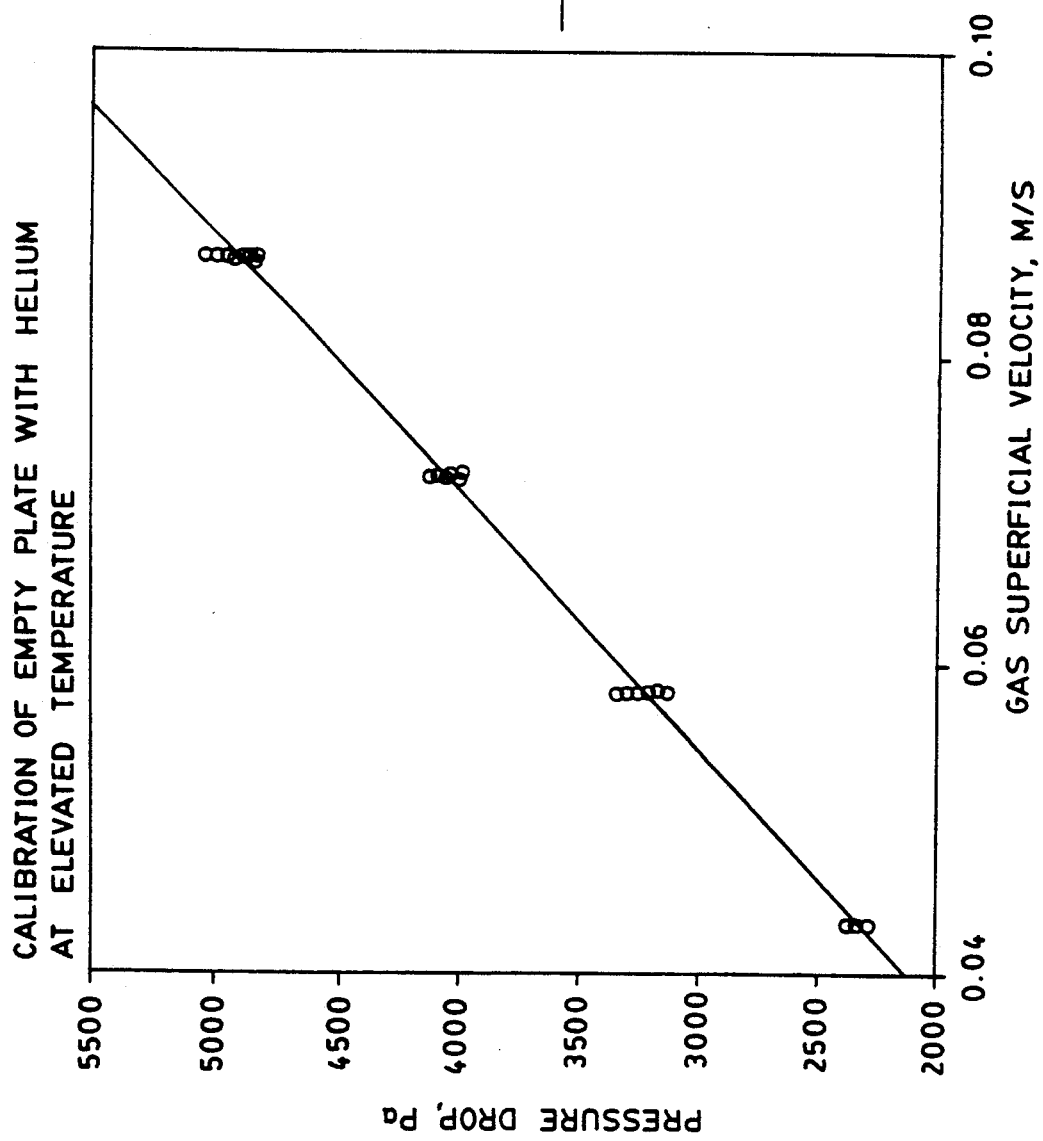
FIG. 14 shows $\Delta P_{d,h}$ versus U for incoming helium at an elevated temperature.

FIG. 13 shows $\Delta P_{d,s}$ versus U for incoming helium at about standard temperature. The line of best fit to the data is described by the equation $\Delta P_{d,s}=27581.02$ U−48.83, where multiple $R^2$ is 0.9996. FIG. 14 shows $\Delta P_{d,h}$ versus U for incoming helium at an elevated temperature. The line of best fit to the data is described by the equation $\Delta P_{d,h}=59811.61$ U−270.11, where multiple $R^2$ is 0.9984. Over the duration of the run, the mean $T_{g,p}$ is 616.2 K while the standard deviation is 4.4 K.

The computed value of U always refers to standard conditions of 294.1 K and 0.1 MPa. It is clear from FIGS. 13 and 14 that for a given mass flow rate of helium, a higher gas temperature results in a larger distributor pressure drop. The increase in $\Delta P_d$ with $T_{g,p}$ is correlated with $\mu_g$ in a manner analogous to that developed for the nitrogen runs. For U=0.0362 m/s (25% setting on the mass flow controller 14), $\Delta P_{d,h}/\Delta P_{d,s}=1.9956$ and the ratio of $\mu_g$ between 616.2 K and 294.1 K or $\mu_h/\mu_s$ is 1.67 which yields an x of 1.347. $\Delta P_d$ at an arbitrary plenum temperature $T_{g,p}$ can now be found from a knowledge of $\Delta P_{d,s}$ and $$(\mu_h/\mu_s)^x$$

where $\mu_h$ is evaluated at $T_{g,p}$.

POWDER FLUIDIZATION WITH HELIUM AT STANDARD TEMPERATURE

Figure 15:
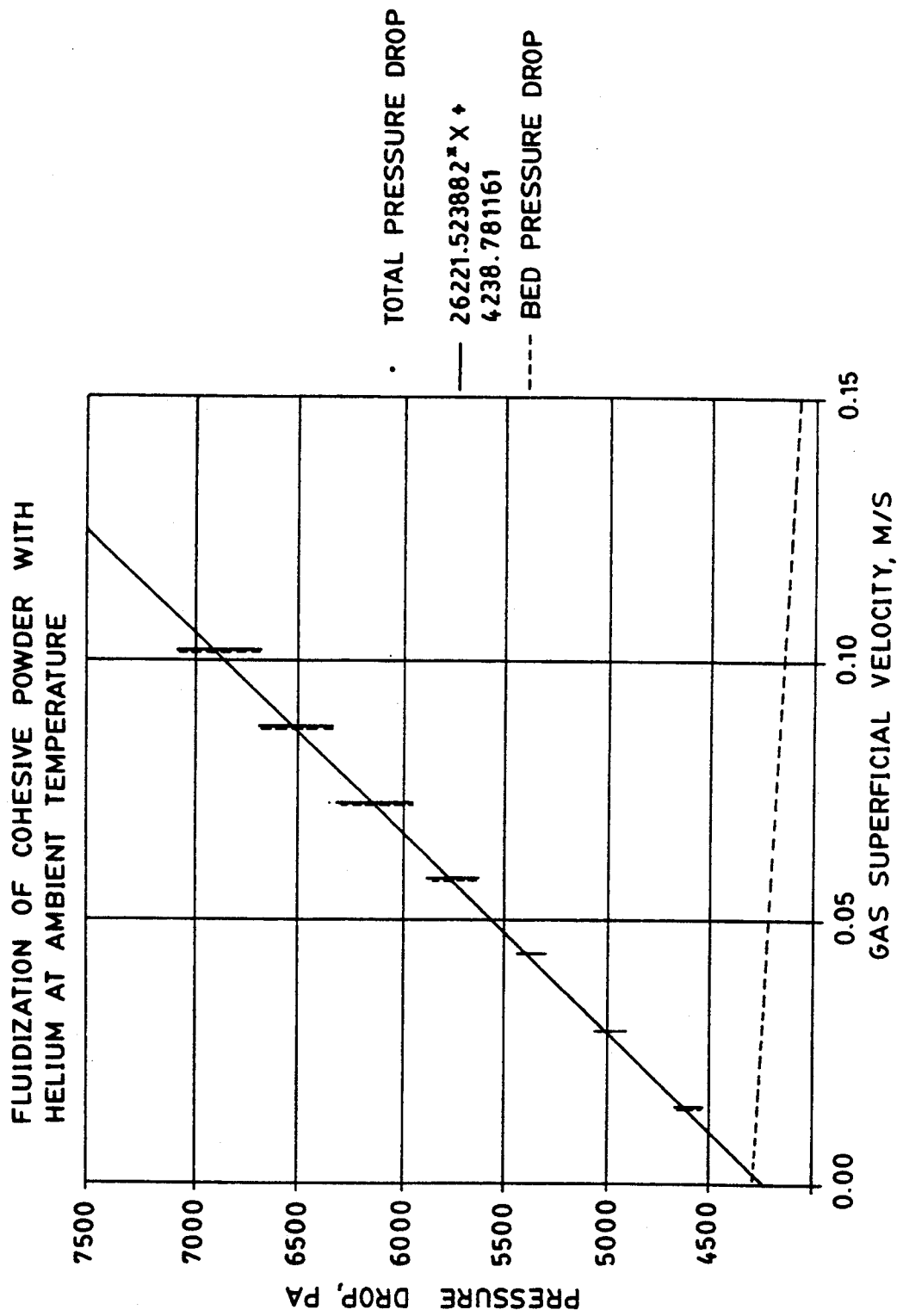
FIG. 15 shows the dependence of $\Delta P_t$ on U, described by the expression $\Delta P_t = 26221.52\ U + 4238.78$ where multiple $R^2$ is 0.9922.

A mass of 3.5 kg of the powder is introduced into the column. FIG. 15 shows the dependence of $\Delta P_t$ on U, described by the expression $\Delta P_t=26221.52$ U+4238.78 where multiple $R^2$ is 0.9922. The experiment is conducted by increasing the mass flow controller 14 setting in steps of 10% to a maximum of 70% of full scale. Full scale on the mass flow controller 14 for helium use is 1.158 E-3 m$^3$/s at standard conditions. The fluctuations in $\Delta P_t$ increase with U, the standard deviation in the signal varying from about 46 Pa at U=0.03 m/s to about 128 Pa at U=0.1 m/s. Expressed as a percentage of the mean $\Delta P_t$, the variation in the signal is from 0.90% to about 1.85%. $\Delta P_t$ is the summation of $\Delta P_{d,s}$ and $\Delta P_b$. The contribution from $\Delta P_{d,s}$, obtained in the previous section, is subtracted to obtain the relation: $\Delta P_b=4287.61-1359.49$ U, which is also shown in FIG. 15. This relation yields $\Delta P_b=4151.6$ Pa for U=0.1 m/s. Ideally, a mass of 3.5 kg of powder fluidized in the present column would result in a $\Delta P_b$ of 4294 Pa. This implies an operating $\Delta P_b$ which is 96.7% of ideal bed pressure drop and, as in the nitrogen case, is a conservative number. It is estimated that about 125 g or 3.57% of the initial bed mass is lost over the course of the run.

Elutriation loss is directly related to the operating value of the gas velocity and $U_t$. An estimate of $U_t$ is made from Equation (1) bearing in mind the same caveats as have been expressed for the nitrogen case. $Re_t$ is 373.5 E-6 and $U_t$ is 0.0055 m/s which is about 16 to 18 times smaller than the optimum U (0.09 to 0.1 m/s) when fluidizing at standard temperature. An estimate of $U_{mf}$ from Equation (2) is 0.05 E-3 m/s.

POWDER FLUIDIZATION WITH HELIUM AT ELEVATED TEMPERATURE

A mass of 3.7 kg of powder is introduced into the column, and a flow of Helium with U=0.0362 m/s (25% of full scale) established at standard conditions of temperature. Next, all the four variacs powering the four section heating tape are switched on at a voltage of 70 V. The inline heater for the fluidizing gas is activated at the same time.

Figure 16:
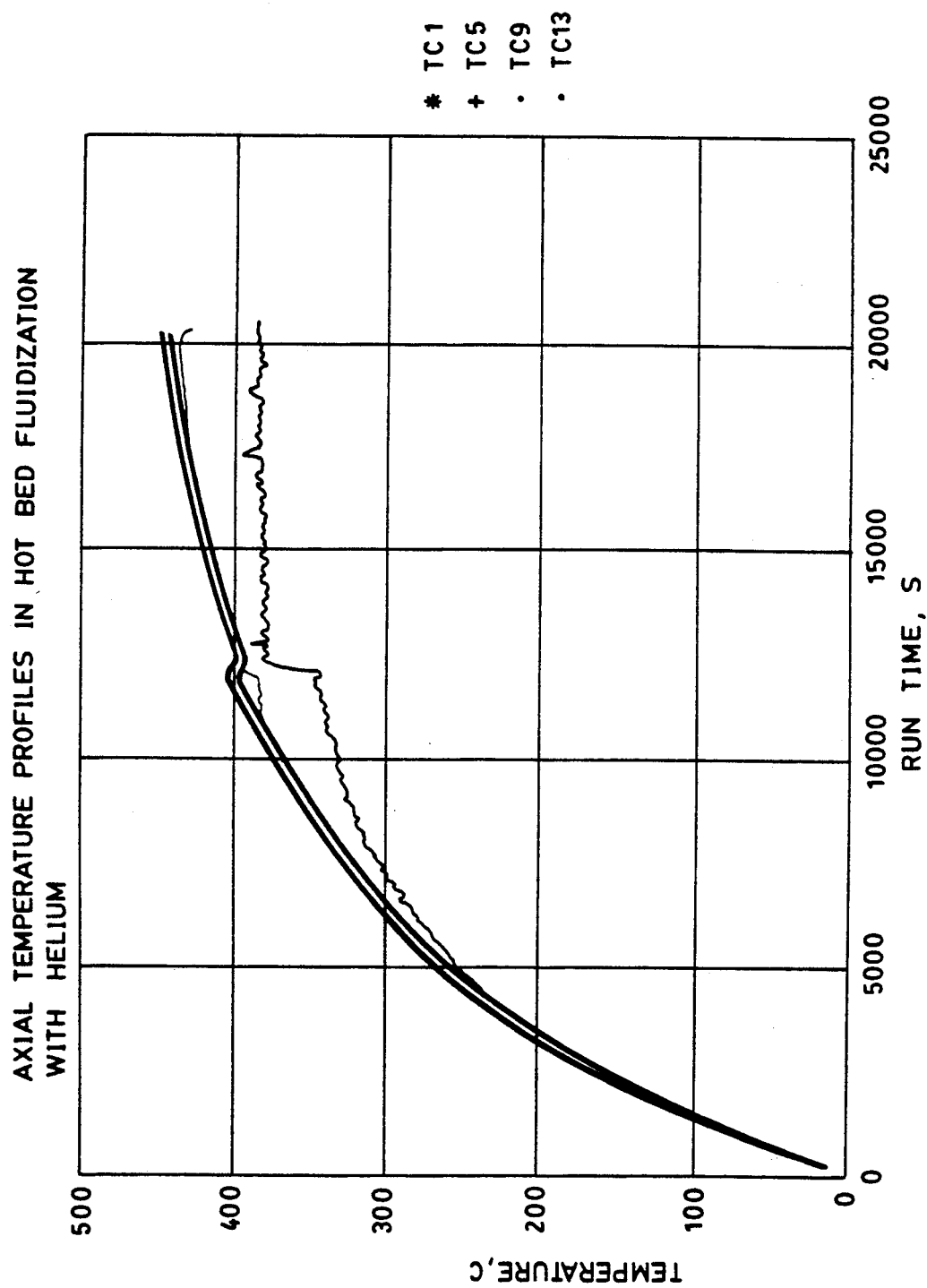
FIG. 16 shows axial temperature profiles at the center line of the column.

Axial temperature profiles at the center line of the column are shown in FIG. 16. There is excellent uniformity in temperature for a height of at least 0.5 m above the distributor plate. The temperature reflected by thermocouple 13, located 0.7 m above the distributor, agrees with the others until about 5000 s after which it starts to trail behind the lower zone thermocouple. This behavior of thermocouple 13 is explained by elutriation loss which lowers the height of the expanded bed below 0.7 m thus exposing that thermocouple to the freeboard where, as in the nitrogen case, a smaller solids loading produces a lower temperature.

Figure 17:
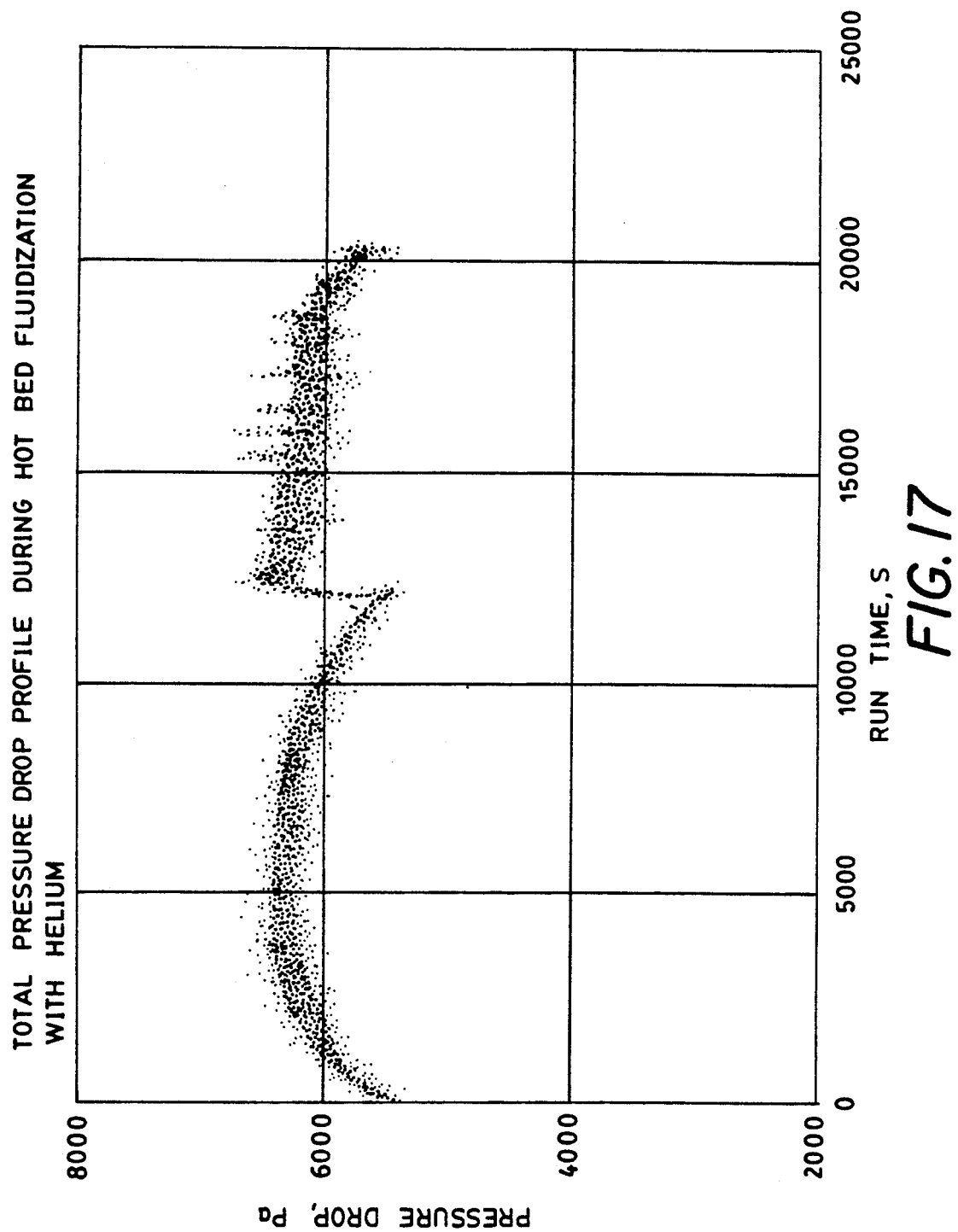
FIG. 17 shows the profile of the total bed pressure drop, $\Delta P_t$, as a function of run time.
Figure 18:
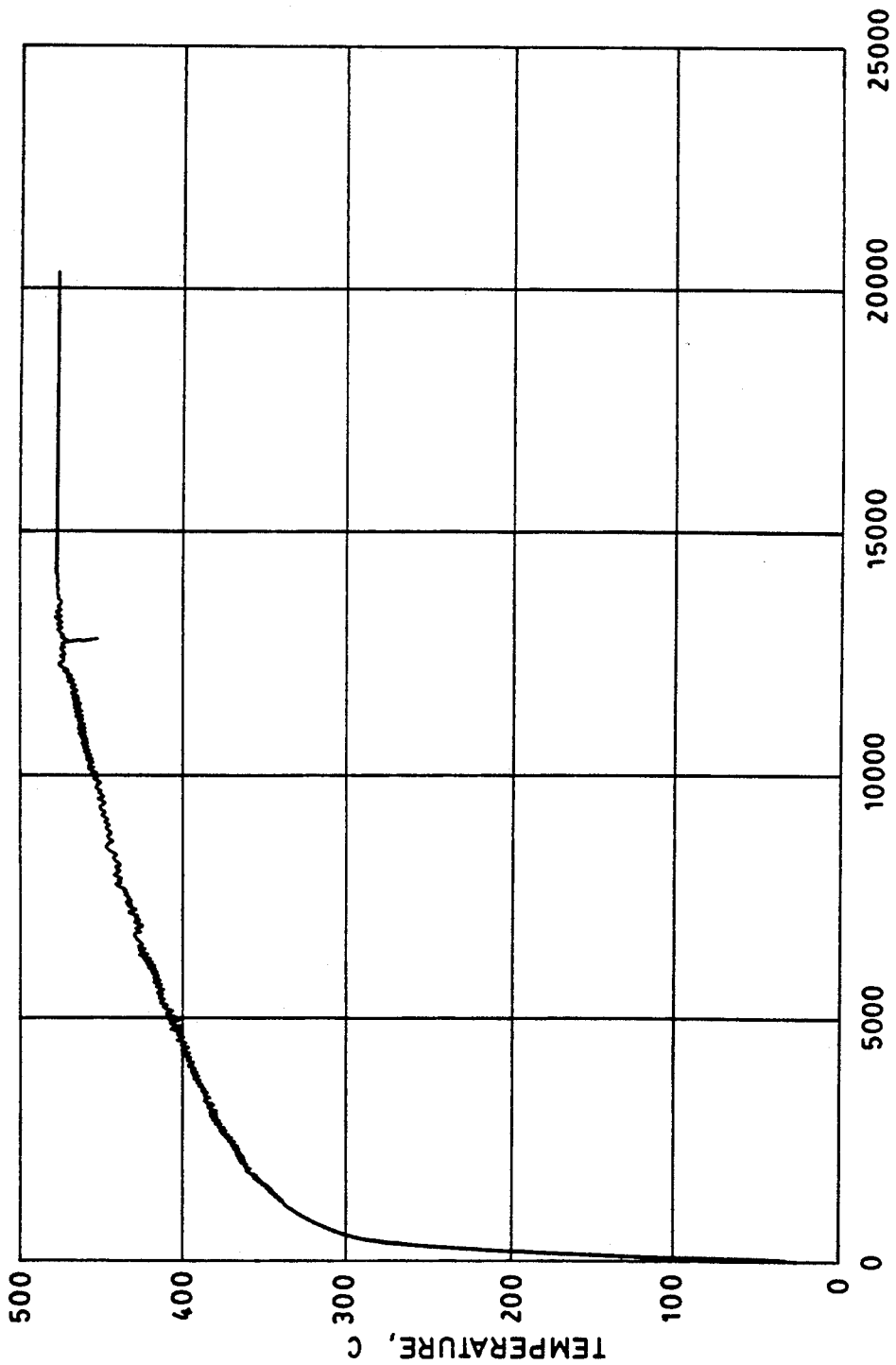
FIG. 18 shows the plenum gas temperature profile
Figure 19:
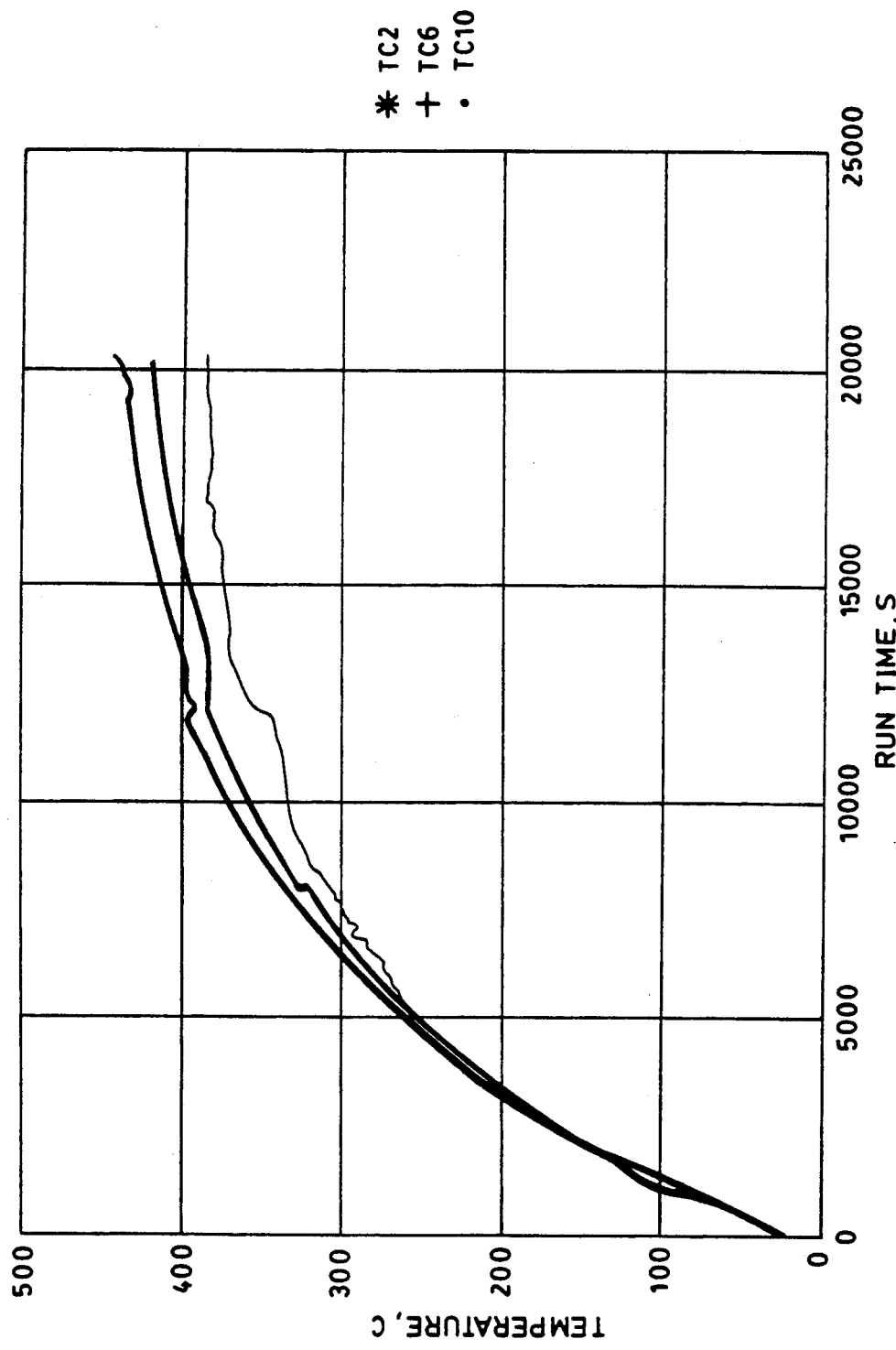
FIG. 19 shows axial temperature profiles at the radial stations in the first quadrant.
Figure 20:
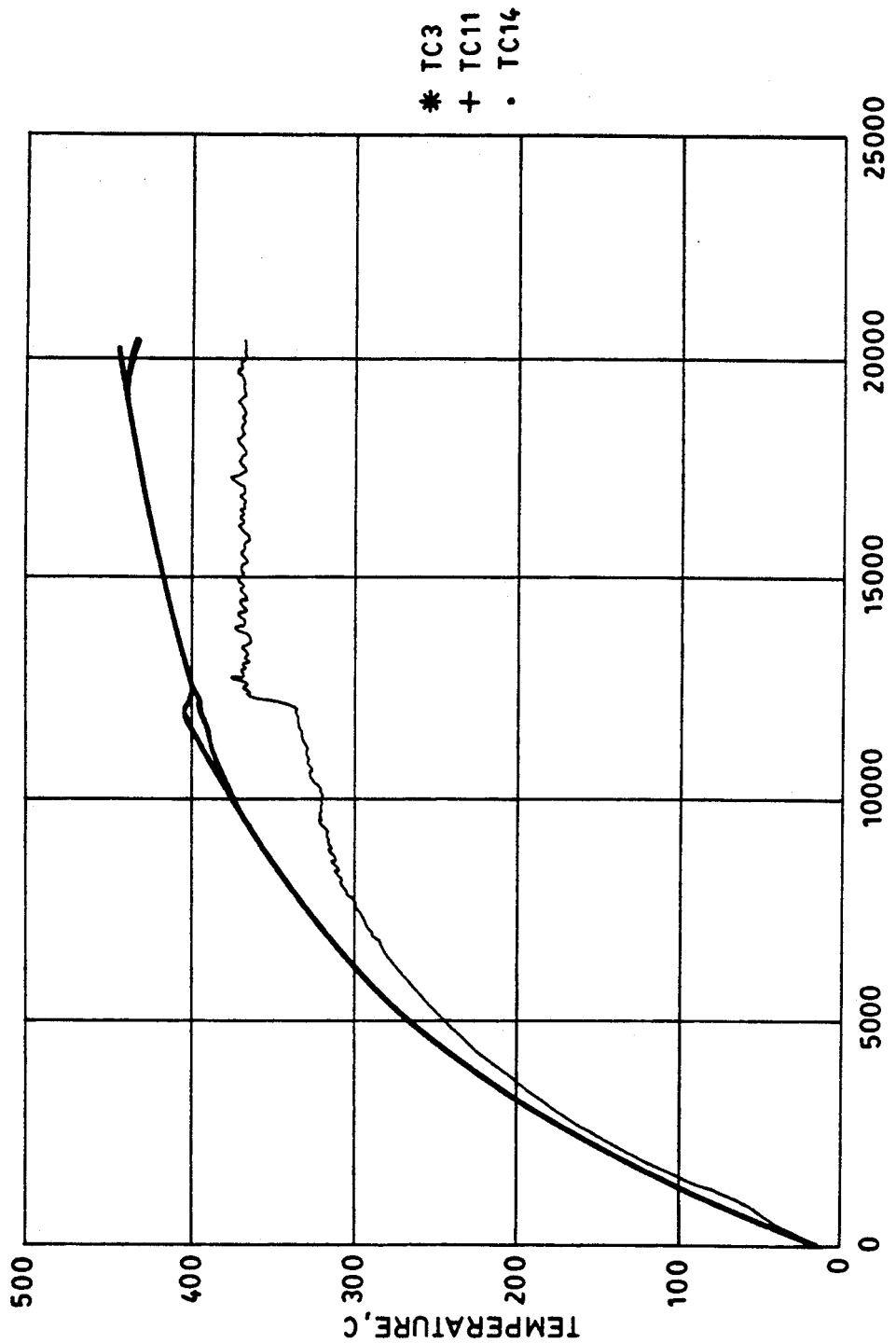
FIG. 20 shows axial temperature profiles at the radial stations in the second quadrant.
Figure 21:
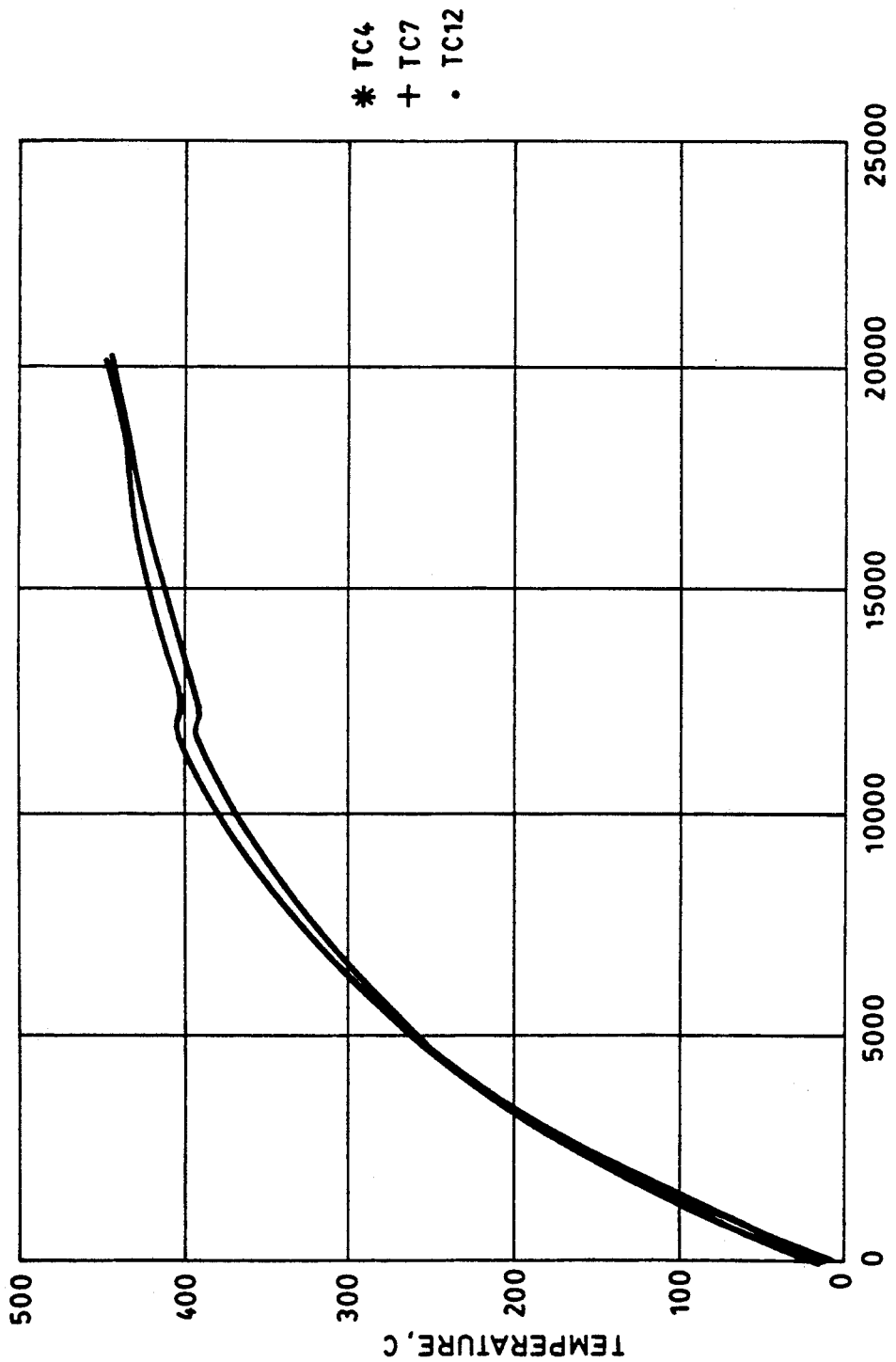
FIG. 21 shows axial temperature profiles at the radial stations in the third quadrant.
Figure 22:
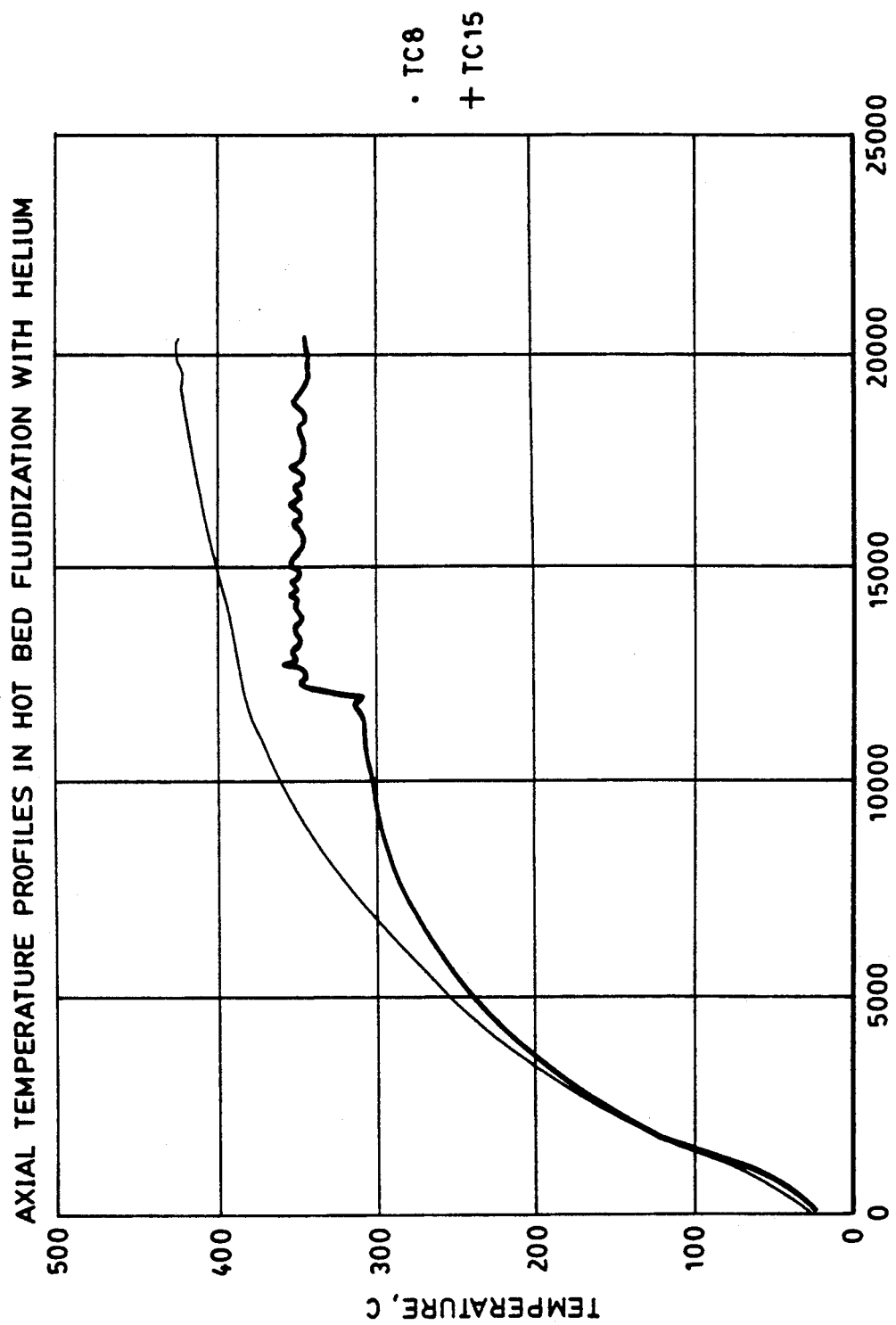
FIG. 22 shows axial temperature profiles at the radial stations in the fourth quadrant.

This explanation of the behavior of thermocouple 13 is supported by observations of $\Delta P_b$. FIG. 17 shows the profile of the total bed pressure drop, $\Delta P_t$, as a function of run time. The total pressure drop shows an increase for about 5000 s after which it starts to decrease. This decrease begins at about the same time that thermocouple 13 starts to depart from the lower thermocouple readings. $\Delta P_t$ is the summation of $\Delta P_{d,h}$ and $\Delta P_b$. The former is quickly established since $\Delta P_{d,h}$ is a function of $T_{g,p}$ which, as shown in FIG. 18, rapidly rises to about 70% of its final value. The gradual increase in $\Delta P_t$ is, therefore, attributed to a gradual development of $\Delta P_b$ similar to that for the nitrogen hot bed. As the bed temperature increases, the effective gas velocity also increases until at about 5000 s, or equivalently an average bed temperature of about 530 K, elutriation losses start to reduce $\Delta P_b$ more than the improved gas flow increases $\Delta P_b$. The drop in $\Delta P_b$ due to elutriation, for run times exceeding about 5000 s, causes a progressive decrease in $\Delta P_t$ as observed in FIG. 17.

The axial temperature profiles at the radial stations in the four quadrants are shown in FIGS. 19 through 22. Quadrant 1, profiled in FIG. 19, has differences between the three thermocouples. In particular, the axial temperature decreases with height above the distributor with a maximum difference of about 20 K between thermocouple 2 and 6 and about 55 K between thermocouple 2 and 10. Quadrant 1 does not include any thermocouple beyond a height of 0.5 m so these differences cannot be attributed to changes in bed height due to elutriation losses. In quadrant 2, displayed in FIG. 20, while thermocouple 3 and 11 show very good agreement, thermocouple 14 departs from them beyond about 5000 s due to elutriation as explained earlier. The three thermocouples in quadrant 3, which remain in the bed, display very good agreement as evidenced in FIG. 21. It is interesting to note that quadrant 3 has the same thermocouple layout pattern as quadrant 1, but the former does not the temperature variation of the latter. The two thermocouples in Quadrant 4 are profiled in FIG. 22. While thermocouple 8 is in the bed, thermocouple 15 is exposed to the freeboard for times exceeding about 5000 s. This results in a lower temperature for thermocouple 15 beyond that time. The temperature study indicates good uniformity throughout the volume of the heated fluidized bed with the exception of one of the quadrants where the maximum temperature difference is about 50 K. In addition, the study shows a distinct difference in temperature between the dense bed and the lean phase freeboard just above it. In particular, the region of the freeboard just above the bed is lower in temperature than the bed by about 75 K.

The computation of $\Delta P_b$ is carried out using the method discussed in the nitrogen section. The approximate value of time beyond which $\Delta P_t$ starts to be affected by elutriation is 5000 s, at which time $T_{g,p}$ is about 683 K and $\Delta P_t$ is about 6350 Pa. For U=0.0362 m/s, $\Delta P_{d,s}$ is 949.6 Pa which yields a value of 2091.3 Pa for $\Delta P_{d,h}$. Knowing $\Delta P_t$ and $\Delta P_{d,h}$, $\Delta P_b$ is found to be 4258.7 Pa. The ideal bed pressure drop for an initial inventory of 3.7 kg is 4539.4 Pa, which implies that the operating $\Delta P_b$ prior to the onset of significant elutriation is about 93.8% of ideal.

Equation (3) describes the heat transfer process for the change in bed temperature with time. Attention is focused on a region of time between 4000 and 5000 s wherein parameters F and G may be considered to be reasonably independent of time for reasons identical to those outlined in the nitrogen section. Values of the relevant variables used in the evaluation of F and G are: A=0.2282 m² for an expanded bed height of 0.72 m, m'=0.048 E-3 kg/s, $C_{pg}$=5.193 kJ/kq.K, $C_{ps}$=1.045 kJ/kg.K and $M_s$=3.7 kg. thermocouple #5 is selected to represent the bed temperature which, over the time domain under focus, changes from 495 K to 529 K with a time mean value of 513 K and a rate of change of 0.034 K/s. During this same interval, $T_w$ and $T_{gp}$ are about 535 K and 678 K respectively. It follows from Equation (3) that h=17.9 W/m².K. For the same difference in temperature between the wall and the bed, the value of h for the helium run is about 45% higher than that obtained for the nitrogen run.

If the bed mass were being heated solely by the incoming hot helium gas, Equation (4) would say that it would take 3188 s to increase the bed temperature from $T_1$=495 K to $T_2$=529 K with $T_{g,p}$=678 K. This is about three times the observed time of 1000 s. This proves the importance of wall to bed heat transfer in the combined heating process.

THERMAL CONDUCTIVITY OF GASES

In this invention, we have shown that fluidizing a cohesive powder like a lamp phosphor with a gas like helium in place of the default gas nitrogen, increases the wall to bed heat transfer coefficient by about 45%. The table below shows the ratio of thermal conductivities of three gases relative to nitrogen. While the thermal conductivity of helium is at least five times that of nitrogen over a broad temperature domain, the ratio of the wall to bed heat transfer coefficients for these two gases is about 1.45, and is not related in a simple manner to the ratio of thermal conductivities of the two gases. It is for this reason that the inventors do not wish to be tied down to a description of the actual mechanism relating gas thermal conductivity to the wall-bed heat transfer coefficient in cohesive powder fluidization. Suffice to say that the experimental data presented in the specification indicate that increasing the fluidizing gas thermal conductivity will enhance the wall to bed heat transfer coefficient in such systems. In particular, it is desired that the thermal conductivity of the fluidizing gas be at least four times that of nitrogen at the bed operating temperature.

| GAS TYPE | RATIO OF K AT 300 K | RATION OF K AT 600 K |
|---|---|---|
| NITROGEN | 1.000 | 1.000 |

| GAS TYPE | RATIO OF K AT 300 K | RATION OF K AT 600 K |
|---|---|---|
| NEON | 1.887 | 1.734 |
| HELIUM | 5.753 | 5.570 |
| HYDROGEN | 6.836 | 6.620 |

Helium is not the only gas which could be used to achieve this enhancement of the heat transfer coefficient. Hydrogen may also be used. Both of these gases have intrinsic thermal conductivities at least four times greater than nitrogen as shown in the table above. It also follows that a blend of gases suitably selected from a group of gases consisting of helium, hydrogen, neon, mixtures thereof including nitrogen will have a mixture thermal conductivity at least four times that of nitrogen, and this blend could could also be used to increase the wall to bed heat transfer coefficient during cohesive powder fluidization.

In order to obtain the thermal conductivity of a blend of gases containing nitrogen, neon, helium and hydrogen at a certain temperature one, needs a mixing rule for thermal conductivities. Reid et al. in "The Properties of Gases and Liquids" McGraw Hill, 4th Edition, p. 530, 1987 discuss methods for computing gas mixture thermal conductivities. All the four gases being considered here are non-polar. Reid et al. state that the thermal conductivity of a non-polar mixture of gases is lower than would be predicted from a mole fraction average, and this deviation from a linear mixing rule is larger the greater the difference in molecular weights of the components. For accurate calculations, the Wassiljewa equation with the Mason-Saxena modification is recommended by Reid et al.

As a first approximation, however, the linear mixing rule is simpler to use. An example of its use is illustrated.

$$k_m = \Sigma k_i y_i$$

where $k_m$ is the mixture thermal conductivity
and $k_i$ is the thermal conductivity of gas i
and $y_i$ is the mole fraction of gas i in the mixture Suppose it is desired to formulate a gas mixture for which $k_m/k_{n2}$ is 4 at a temperature of say 600 K. The appropriate temperature to select for this calculation would be the desired bed temperature. From the above equation and the table of the ratios of $k_i$ to $k_{n2}$ we have, $$y_{h2}(6.62) + y_{he}(5.57) + y_{ne}(1.734) + (1 - y_{h2} - y_{he} - y_{ne}) = 4$$

This equation has three unknowns and requires input of two mole fractions for a deterministic solution. Say $y_{h2}$ and $y_{ne}$ are chosen to be 0.1 each. It then follows that $y_{he} = 0.5174$ from which $y_{n2}$ is found to be 0.2825. The composition of the blend is, therefore, 28.25% nitrogen, 51.74% helium, 10% hydrogen and 10% neon. This technique may be used to obtain approximate composition of blends of gases with thermal conductivities at least four times that of nitrogen.

It is concluded from this study that it is possible to enhance the heat transfer coefficient in cohesive powder fluidization by using helium as the fluidizing gas in place of the default gas, nitrogen. In particular, it has been found that using helium instead of nitrogen to fluidize a hot bed of cohesive Geldart type C phosphor particles increases the wall to bed heat transfer coefficient by about 45%. The increase in heat transfer coefficient is attributed to the higher thermal conductivity of helium relative to nitrogen. Helium is not the only gas which could be used to enhance the heat transfer characteristics in cohesive powder fluidization. In accordance with the principles of the present invention, prior to fluidizing the particles in the bed, a fluidizing gas is selected so as to comprise a heat transfer enhancing portion with the remaining portion being a heat transfer diluent portion, the composition of the gas being such that the effective thermal conductivity is at least four times that or nitrogen at the bed operating temperature. The heat transfer enhancing portion comprises sufficient amount of helium, hydrogen or mixtures thereof. The heat transfer diluent portion comprises diluent gases which are utilized only in such an amount that the thermal conductivity of the resulting mixture does not decrease below at least four times that of nitrogen. The preferred diluent gases are nitrogen and neon.

NOTATION

A: area for wall to bed heat transfer, m$^2$
$C_D$: fluid dynamic drag coefficient
$C_{pg}$: specific heat of fluidizing gas, kJ/kg.K
$C_{ps}$: specific heat of bed solids, kJ/kg.K
d: particle diameter, m
h: wall to bed heat transfer coefficient, W/m$^2$.K
m': mass flow rate of fluidizing gas, kg/s
$M_s$: mass of powder in bed, kg
$\Delta P_b$: bed pressure drop, Pa
$\Delta P_d$: distributor pressure drop in general, Pa
$\Delta P_{d,h}$: distributor pressure drop at elevated temperature, Pa
$\Delta P_{d,s}$: distributor pressure drop at standard temperature, Pa
$\Delta P_t$: total pressure drop, Pa
$Re_t$: Reynolds number at terminal velocity conditions
t: elapsed time, s
T: bed temperature, K
$T_{gp}$: plenum gas temperature, K
$T_w$: wall temperature, K
U: superficial gas velocity at standard conditions
$U_{mf}$: minimum fluidization velocity, m/s
$U_t$: terminal velocity, m/s
x: exponent for viscosity ratio
$\mu_g$: gas viscosity, Pa.s
$\mu_h$: gas viscosity at elevated temperature, Pa.s
$\mu_s$: gas viscosity at standard temperature, Pa.s
$\rho_g$: gas density, kg/m$^3$
$\rho_p$: particle density, kg/m$^3$

TABLE 1

| | PHYSICAL PROPERTIES OF THE GASES | | | | |
|---|---|---|---|---|---|
| T(K) | DENSITY kg/m$^3$ | VISCOSITY Pa.s × 1E-6 | SPECIFIC HEAT kJ/kg · K | THERMAL CONDUCTIVITY W/m · K × 1E-3 | PRANDTL NUMBER |
| 294.1 (He) | 0.1664 | 19.63 | 5.193 | 152.8 | 0.667 |
| 294.1 (N$_2$) | 1.1649 | 17.57 | 1.039 | 25.5 | 0.715 |

TABLE 1-continued

| | PHYSICAL PROPERTIES OF THE GASES | | | | |
|---|---|---|---|---|---|
| T(K) | DENSITY kg/m$^3$ | VISCOSITY Pa.s × 1E-6 | SPECIFIC HEAT kJ/kg · K | THERMAL CONDUCTIVITY W/m · K × 1E-3 | PRANDTL NUMBER |
| 600 (He) | 0.0813 | 32.20 | 5.193 | 251.0 | 0.666 |
| 600 (N$_2$) | 0.5691 | 29.27 | 1.075 | 44.1 | 0.713 |

We claim:

1. A method for enhancing heat transfer in a bed of powder comprising cohesive Geldart type C particles confined by a wall of a vertically oriented container and being fluidized by the upward flow of gas through said bed of powder, said method comprising transferring heat between said bed of powder and said wall of said container, and, prior to fluidizing said particles, selecting a fluidizing gas comprising a sufficient amount of helium, hydrogen, or mixtures thereof for obtaining a thermal conductivity of said fluidizing gas of at least four times greater than nitrogen at the bed operating temperature for enhancing heat transfer between said wall and said bed.

2. A method for enhancing heat transfer in a bed of powder according to claim 1 wherein a remaining portion of said fluidizing gas comprises a diluent gas.

3. A method for enhancing heat transfer in a bed of powder according to claim 2 wherein said diluent gas comprises neon or nitrogen.

4. A method for enhancing heat transfer in a bed of powder according to claim 3 wherein said diluent gas comprises nitrogen.

5. A method for enhancing heat transfer in a bed of powder according to claim 1 wherein said bed has a bed operating temperature, said wall has a wall operating temperature different than said bed operating temperature wherein heat is transferred between said bed and said wall in accordance with said temperature differential, and said fluidizing gas has an effective thermal conductivity at said bed operating temperature.

6. A method for enhancing heat transfer in a bed of powder according to claim 5 wherein at least a portion of said fluidizing gas comprises helium.

7. A method for enhancing heat transfer in a bed of powder according to claim 6 wherein a remaining portion of said fluidizing gas comprises a diluent gas.

8. A method for enhancing heat transfer in a bed of powder according to claim 7 wherein said diluent gas comprises nitrogen or neon.

9. A method for enhancing heat transfer in a bed of powder according to claim 5 wherein said fluidizing gas comprises a mixture of gases and said effective thermal conductivity is determined by a linear rule of mixtures.

10. A method for enhancing heat transfer in a bed of powder according to claim 1 wherein said fluidizing gas consists essentially of helium.

11. A method for enhancing heat transfer in a bed of powder according to claim 1 wherein said particles comprise have a Hausner ratio of greater than about 1.4.

12. A method for enhancing heat transfer in a bed of powder according to claim 1 wherein said particles have an average particle size of less than about 20 microns.

13. A method for enhancing heat transfer in a bed of powder according to claim 1 wherein said particles comprise phosphor particles.

14. A method for enhancing heat transfer in a bed of powder according to claim 1 wherein said fluidizing gas has a superficial velocity through said bed of powder of about 0.07 to about 0.14 meters per second as measured at standard conditions of 294.1 K and 0.1 MPa.

15. A method for enhancing heat transfer in a bed of powder according to claim 14 wherein said fluidizing gas has a superficial velocity through said bed of powder of about 0.09 to about 0.11 meters per second as measured at standard conditions of 294.1 K and 0.1 MPa.

16. A method for enhancing heat transfer in a bed of powder according to claim 15 wherein said fluidizing gas has a superficial velocity through said bed of powder of about 0.10 meters per second as measured at standard conditions of 294.1 K and 0.1 MPa.

17. A method for enhancing heat transfer in a bed of powder according to claim 1 including a source of fluidizing gas under pressure communicating with said container for the upward flow of fluidizing gas.

18. A method for enhancing heat transfer in a bed of powder according to claim 17 wherein said container includes a permeable member at a bottom portion of said bed for distributing said fluidizing gas into said bed.

19. A method for enhancing heat transfer in a bed of powder according to claim 18 comprising transferring heat between said bed and said wall by controlling the temperature of said wall.

20. A method for enhancing heat transfer in a bed of powder according to claim 19 wherein said container comprises a vertically oriented wall and said bottom portion comprises a gas permeable member extending transverse to said wall of said container for the upward flow of fluidizing gas there through, said gas permeable member being connected to a source of fluidizing gas under pressure.

* * * * *